United States Patent
Saga

(10) Patent No.: US 7,724,291 B2
(45) Date of Patent: May 25, 2010

(54) IMAGE INPUT APPARATUS AND CONTROL METHOD

(75) Inventor: Yoshihiro Saga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1045 days.

(21) Appl. No.: 10/976,088

(22) Filed: Oct. 26, 2004

(65) Prior Publication Data
US 2005/0094001 A1    May 5, 2005

(30) Foreign Application Priority Data
Oct. 29, 2003    (JP) .............................. 2003-369220

(51) Int. Cl.
*H04N 5/76* (2006.01)
*H04N 5/761* (2006.01)

(52) U.S. Cl. ............................. 348/231.99; 348/231.8; 348/231.9

(58) Field of Classification Search ............ 348/231.99, 348/578, 228.1, 233, 222, 231, 231.1, 231.2, 348/208.15, 333.04, 333.07
See application file for complete search history.

(56) References Cited

U.S. PATENT DOCUMENTS

| | | | | |
|---|---|---|---|---|
| 5,805,219 A | * | 9/1998 | Ejima et al. | 348/375 |
| 6,515,697 B1 | * | 2/2003 | Yamada et al. | 348/231.6 |
| 6,542,186 B2 | * | 4/2003 | Uryu | 348/231.7 |
| 6,856,348 B1 | | 2/2005 | Okada | |
| 2001/0005231 A1 | * | 6/2001 | Kubo | 348/341 |
| 2001/0009439 A1 | * | 7/2001 | Hwang | 348/232 |
| 2001/0022620 A1 | * | 9/2001 | Niwa | 348/231 |
| 2002/0001036 A1 | * | 1/2002 | Kinjo | 348/231 |
| 2002/0041330 A1 | * | 4/2002 | Uryu et al. | 348/233 |

FOREIGN PATENT DOCUMENTS

| | | | |
|---|---|---|---|
| JP | 10011405 A | * | 1/1998 |
| JP | 10-97357 | | 4/1998 |
| JP | 2000-295508 | | 10/2000 |

* cited by examiner

*Primary Examiner*—David L Ometz
*Assistant Examiner*—Ahmed A Berhan
(74) *Attorney, Agent, or Firm*—Canon USA IP Division

(57) ABSTRACT

An image input apparatus includes (a) a connection unit capable of connecting with a detachable storage medium; (b) a storage unit that stores a program for controlling the image input apparatus; (c) a bus communicably coupled with the storage unit and the connection unit; (d) a container unit adapted to contain the detachable storage medium; (e) a detecting unit adapted to detect whether a cover on the container unit is open; (f) a control unit configured to use the bus to access the detachable storage medium or the storage unit; and (g) a display unit that displays a message notifying a user that the cover is open, if the detecting unit detects that the cover is open. If the detecting unit detects that the cover is open, the control unit disables access from the control unit to the storage unit.

6 Claims, 17 Drawing Sheets

IMAGE INPUT APPARATUS AND CONTROL METHOD

CROSS-REFERENCE TO RELATED APPLICATIONS

This application claims priority from Japanese Patent Application No. 2003-369220 filed Oct. 29, 2003, which is hereby incorporated by reference herein.

BACKGROUND OF THE INVENTION

1. Field of the Invention

The present invention relates to an image input apparatus, such as a digital camera, to which an external recording medium is removably attachable, and a control method therefore.

2. Description of Related Art

In a conventional digital camera, an interface circuit such as a buffer is provided between a system bus and a socket for a memory card, as disclosed in Japanese Laid-Open Patent Application No. 2000-295508. The interface circuit is configured to connect the memory card to the system bus. The system bus is included in a control system to which a microprocessor and memories, such as a ROM and a RAM, are connected. The interface circuit is composed mainly of a bus transceiver and has the function of preventing noise from being transmitted to the system bus. This noise occurs when a power source for the memory card is turned off for the purpose of saving electric power or when operation modes of the memory card are changed or when the memory card is inserted or removed while being supplied with electric power.

However, since the interface circuit has various components, sufficient space for mounting these components is required. This causes an increase in size of the system and an increase in cost thereof.

Furthermore, in cases where, in the above-described digital camera, the control system is composed of one integrated circuit, an interface circuit is also required between the memory card and a system bus included in the integrated circuit in order to prevent the turning-off of the power source for the memory card or the insertion or extraction of the memory card with power supplied from affecting the system bus. This necessitates that the integrated circuit be provided with data bus pins for the memory card in addition to pins for devices such as a ROM. Therefore, the integrated circuit is required to have a large number of pins. As a result, the integrated circuit becomes larger, thereby causing an increase both in system size and in cost of the integrated circuit.

Japanese Laid-Open Patent Application No. Hei 10-97357 discloses a system for coping with this problem. In that technology, in a system in which a PC card (PCMCIA card) is used as the memory card, a data bus and an address bus for the PC card are coupled to a data bus and an address bus of the system together with a ROM, a RAM, etc. During a period of time when the state of card detection terminals of the PC card is changing, the operation of a CPU of the system is caused to temporarily stop. Accordingly, it is possible to eliminate the influence of noise caused by insertion or extraction of the PC card.

However, it is difficult to detect all of the noise caused by insertion or extraction of the memory card (PC card) by using the card detection terminals of the PC card. For example, if the power source terminals of the PC card have deteriorated, the PC card's power source may be shut off before the insertion or extraction of the PC card detection terminals is detected. In this case, the data bus level is made low by the PC card power shut off such that data output from a memory element is accidentally changed. In this instance, if the CPU is in the process of reading out instructions from the ROM, the instructions read out by the CPU may be erroneous thus resulting in a system crash (system hang up).

SUMMARY OF THE INVENTION

An object of the present invention is to overcome one or more of the disadvantages of conventional image input apparatuses.

Accordingly, one advantage of the image input apparatus (e.g., digital camera) of the present invention is that system crashes due to noise signals caused when a removable recording medium is detached are prevented. Another advantage is that smaller system units can be produced at reduced cost.

In an aspect of the present invention, an image input apparatus includes a connection unit capable of connecting with a detachable storage medium; a storage unit that stores a program for controlling the image input apparatus; a bus communicably coupled with the storage unit and the connection unit; a container unit adapted to contain the detachable storage medium; a detecting unit adapted to detect when a cover on the container unit is open; and a control unit configured to use the bus to access the detachable storage medium or the storage unit, wherein when the detecting unit detects that the cover is open, the control unit disables access from the control unit to the storage unit.

In another aspect of the present invention, a control method for an image input apparatus including a connection unit capable of connecting with a detachable storage medium, a storage unit that stores a program for controlling the image input apparatus, a bus communicably coupled with the storage unit and the connection unit, a container unit adapted to contain the detachable storage medium, and a control unit configured to use the bus to access the detachable storage medium or the storage unit, the control method comprising steps of detecting that a cover on the container unit is open, and when it is detected that the cover is open, disabling access from the control unit to the storage unit.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Embodiments of the invention will be described in detail below with reference to the drawings.

First Embodiment

Figure 1:
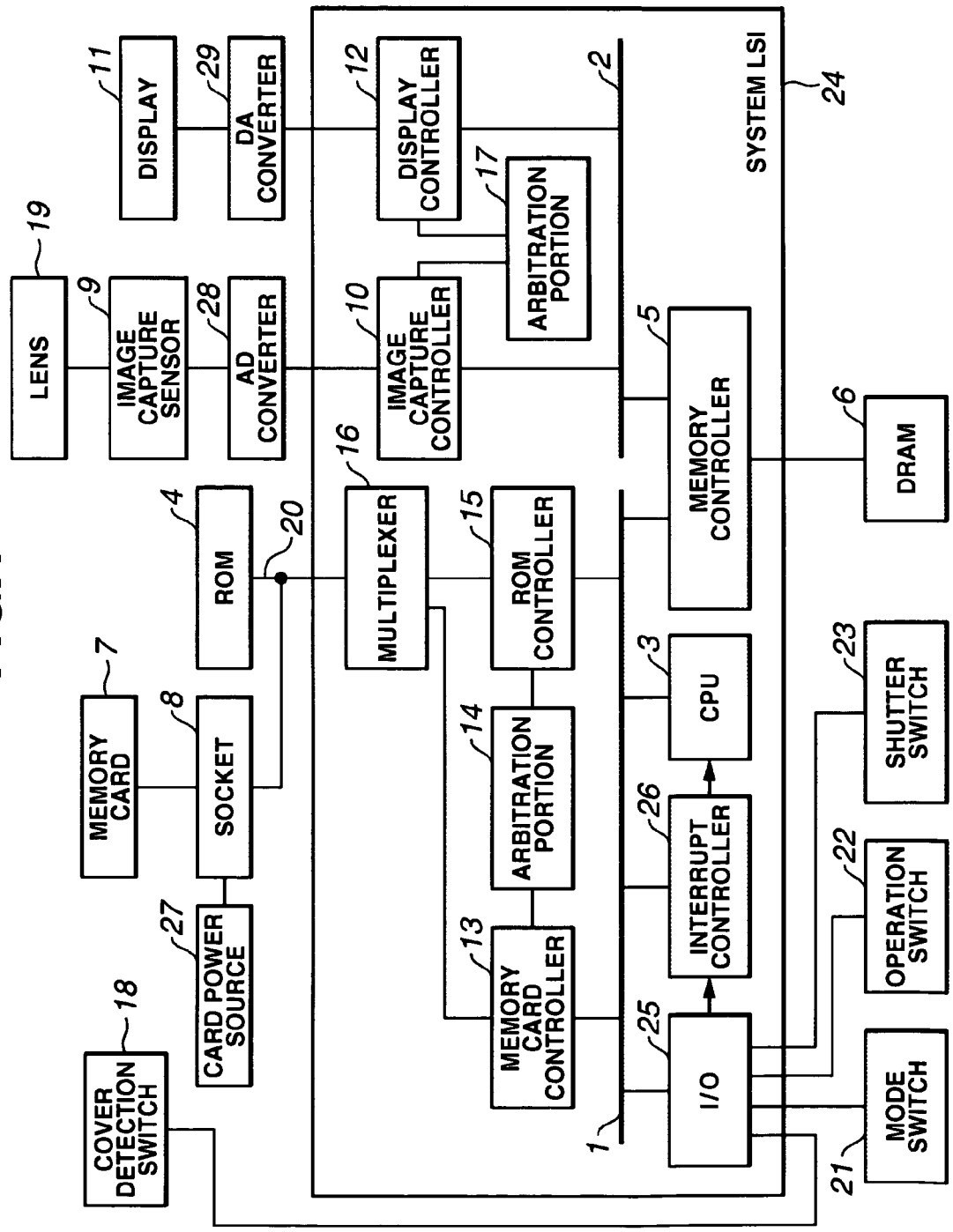
FIG. 1 is a block diagram showing the construction of a digital camera according to a first embodiment of the invention.

FIG. 1 is a block diagram showing the construction of a digital camera, which is an example of an image input apparatus according to a first embodiment of the invention.

The digital camera according to the first embodiment is composed of a system in which a ROM (Read Only Memory) and a DRAM (Dynamic Random Access Memory) have respective separate buses. Since the DRAM control signal requires higher timing constraints (to increase access speed) relative to that of the ROM, the DRAM bus is often provided separately from the ROM bus.

More specifically, as shown in FIG. 1, the digital camera includes a system LSI 24 which constitutes a control system thereof. The system LSI 24 has two buses, i.e., a CPU bus 1 and an image bus 2. To the CPU bus 1 are connected a CPU 3, a memory controller 5, a memory card controller 13, a ROM controller 15, an I/O (input/output interface) 25 and an interrupt controller 26. The CPU 3 serves as a bus master for the CPU bus 1. The CPU bus 1 is used to transfer data in response to a data transfer request from the CPU 3. To the image bus 2 are connected the memory controller 5, an image capture controller 10 and a display controller 12. The image capture controller 10 and the display controller 12 serve as bus masters for the image bus 2. The image bus 2 is used to transfer data in response to a data transfer request from the image capture controller 10 or the display controller 12. Data transfer requests from the image capture controller 10 and the display controller 12 are arbitrated by an arbitration portion 17.

The memory controller 5 receives respective DRAM access requests from the CPU bus 1 and the image bus 2, forms an access signal to a DRAM 6 while arbitrating the DRAM access requests, and performs data writing in the DRAM 6 or data reading from the DRAM 6. The DRAM 6 stores work data used for executing programs, stores image data captured by the digital camera and stores image data for display on a display 11.

When gaining access to a ROM bus 20, the ROM controller 15 or the memory card controller 13 is given a bus use right according to an arbitration performed by an arbitration portion 14. Then, one of the ROM controller 15 and the memory card controller 13 to which the bus use right is given is enabled to use the ROM bus 20 via a multiplexer 16. This enables the ROM controller 15 to access a ROM 4 or enables the memory card controller 13 to access a memory card 7. The ROM 4 has a program stored therein for execution by the CPU 3 to control the digital camera. The memory card 7 is used to mainly store image files obtained by a shooting operation of the digital camera. The memory card 7 is connectable to the ROM bus 20 via a socket 8, which is configured such that the memory card 7 is removably attachable to the socket 8. The socket 8 is directly connected to the ROM bus 20 without any interface circuit such as a buffer. In addition, a data bus of the memory card 7 for use in the digital camera is composed of data lines, address lines and control lines of 16 bits. The memory card 7 is supplied with electric power from a card power source 27 via the socket 8.

Figure 7:
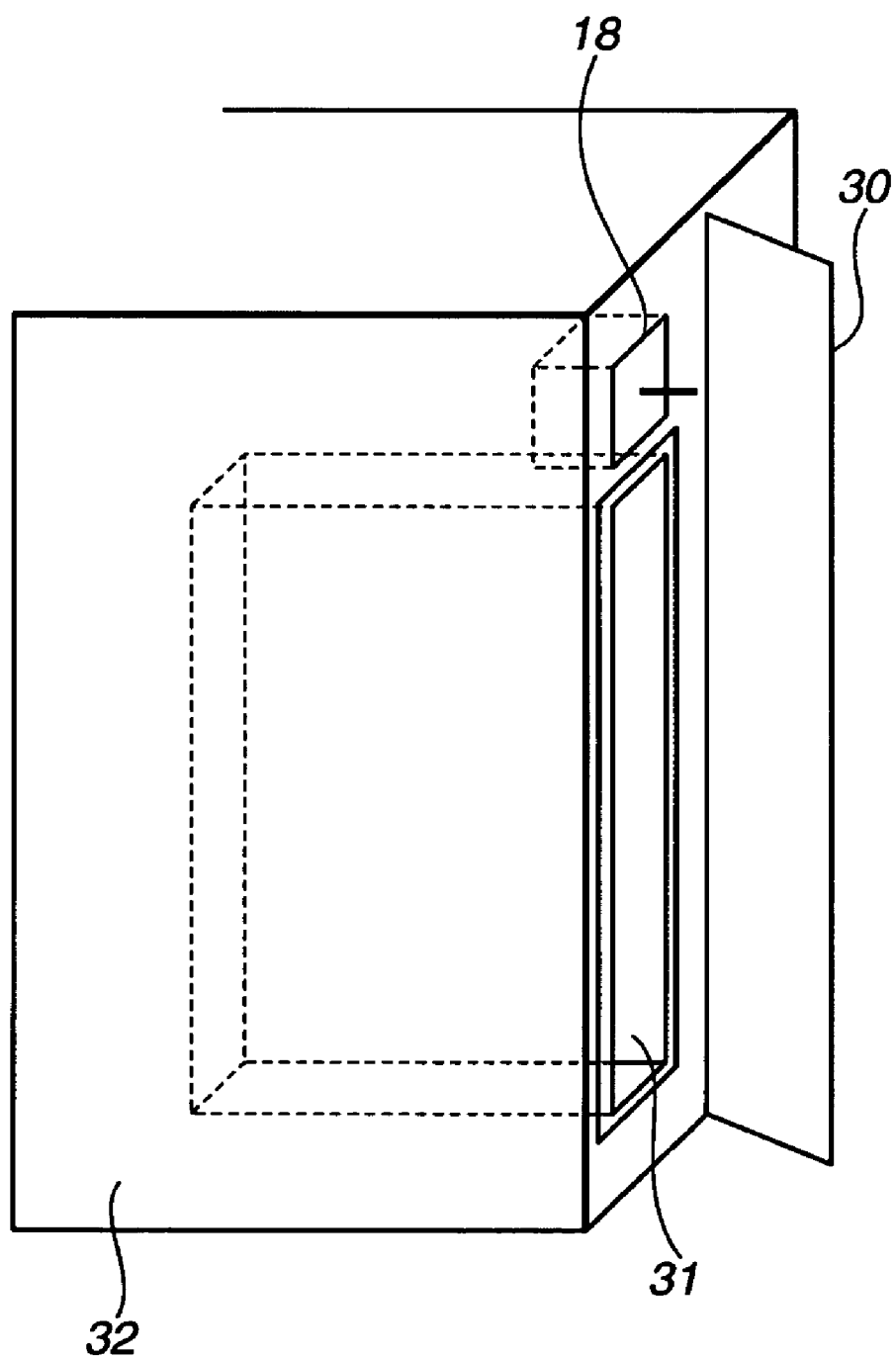
FIG. 7 is a perspective view showing the relationship between a cover detection switch 18 and the cover 30, which is provided at an aperture portion (container portion) for insertion and extraction of the memory card 7.

To the I/O 25 are connected a mode switch 21 for allowing a user to select an operation mode of the digital camera, an operation switch 22 for allowing the user to input instructions to the digital camera, a shutter switch 23 for instructing the digital camera to start a shooting operation, and a cover detection switch 18. The cover detection switch 18 is configured to detect an open or closed state of a cover 30 provided on a container portion 31 (as shown in FIG. 7) used for receiving the memory card 7. The CPU 3 determines whether the cover 30 is open or closed on the basis of an output of the cover detection switch 18.

The interrupt controller 26 receives an interrupt request signal from each module of the digital camera. Then, the interrupt controller 26 processes the interrupt request signal on the basis of predetermined setting values and outputs the processed signal. The output of the interrupt controller 26 is supplied to an interrupt request input terminal of the CPU 3. This enables each module to send an interrupt request to the CPU 3. Accordingly, when the cover detection switch 18 has detected the open state of the cover 30, this detection enables an interrupt request signal to be generated and supplied to the CPU 3.

The image capture controller 10 is a circuit for generating digital image data by processing a digital image signal obtained from an image capture sensor 9. The image capture sensor 9 converts an object image formed by a lens 19 into an electrical signal. The electrical signal is converted into a digital signal by an AD converter 28 and is then supplied to the image capture controller 10.

The display controller 12 generates a digital image signal from digital image data stored in the DRAM 6. The generated digital image signal is converted into an analog image signal by a DA converter 29 and is then supplied to the display 11. The display 11 is composed of a color liquid crystal display panel, etc., and is configured to display thereon an image represented by the analog image signal.

As described above, in the digital camera according to the first embodiment, the ROM 4 and the memory card 7 are directly connected to the ROM bus 20. Therefore, the ROM 4 and the memory card 7 do no have respective separate buses. A single bus, i.e., the ROM bus 20, is used both for the ROM 4 and the memory card 7. In addition, any external integrated circuit, such as a bus transceiver, is not provided between the socket 8 (the memory card 7) and the ROM bus 20. Accordingly, a digital camera is provided in which the space for mounting components is reduced and in which cost reduction is attained.

On the other hand, the system LSI 24 is provided with two buses, i.e., the CPU bus 1 and the image bus 2. The reason for this is as follows.

When a user pushes the shutter switch 23, the digital camera is required to capture an object image formed on the image capture sensor 9 at that time. That is, the system LSI 24 should take in image data from the image capture sensor 9.

In addition, when an image is reproduced and displayed on the display 11, the image displayed on the display 11 should not be distorted in any case. That is, the system LSI 24 should transfer data to the display controller 12.

Therefore, during a shooting operation or during a reproduction operation for image data, with regard to access to the DRAM 6 associated with execution of a program by the CPU 3, access by the image capture controller 10 or the display controller 12 has priority.

In the digital camera according to the first embodiment, in order not to lower the processing speed of the CPU 3 even in the above situation, the CPU bus 1 connected to the ROM 4 and the image bus 2 connected to the DRAM 6 are provided separately from each other. Accordingly, even when the digital camera is recording captured image data on the DRAM 6 or when it is transmitting image data to the display 11, the CPU 3 fetches instructions from the ROM 4 without being hindered by access to the DRAM 6. Therefore, lowering of the processing speed of the CPU 3 is kept to the minimum.

As described above, in the digital camera according to the first embodiment, the ROM 4 and the memory card 7 are arranged to be connected to one and the same bus, i.e., the CPU bus 1. Then, in the case of the first embodiment, when a power source for the memory card 7 is shut off or when the memory card 7 is removed, access to the ROM 4 is prevented, as will be described below.

The positional relationship between the cover detection switch 18 and the cover 30 provided on the opening portion (container portion 31) for insertion and extraction of the memory card 7 is described below with reference to FIG. 7. FIG. 7 is a perspective view showing the positional relationship between the cover detection switch 18 and the cover 30 provided on the opening portion (container portion 31) for insertion and extraction of the memory card 7.

The container portion 31 for receiving the memory card 7 is provided in the side portion of a digital camera body 32, as shown in FIG. 7. The cover 30 on the container portion 31 can open and close to receive and remove the memory card 7 thereof. The open or closed state of the cover 30 is detected by the cover detection switch 18, as described above. The cover detection switch 18 is disposed inside the digital camera body 32 and is configured to output a detection signal indicative of the open or closed state of the cover 30.

Figure 2:
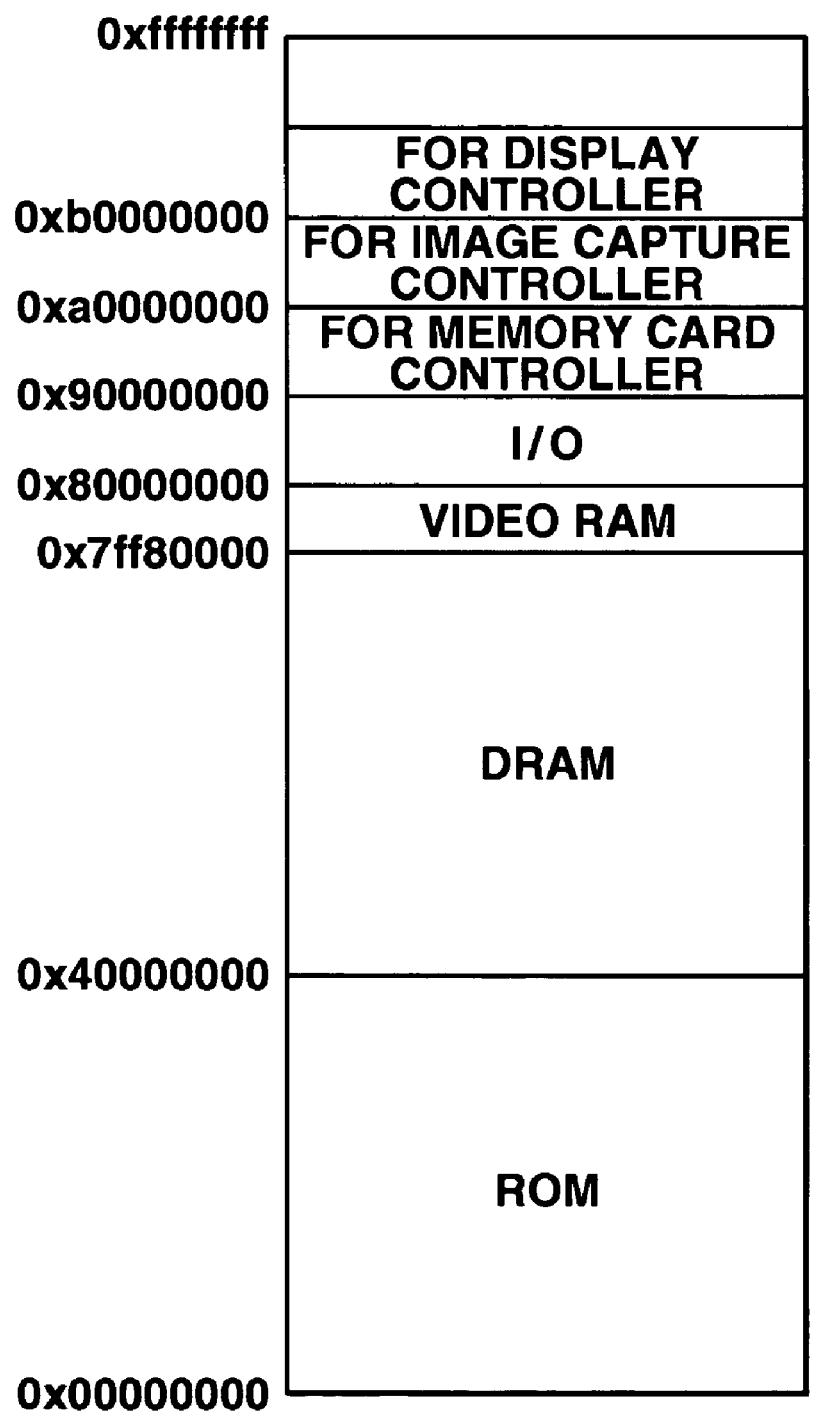
FIG. 2 shows an example of address assignment provided by the system LSI of FIG. 1.
Figure 3:
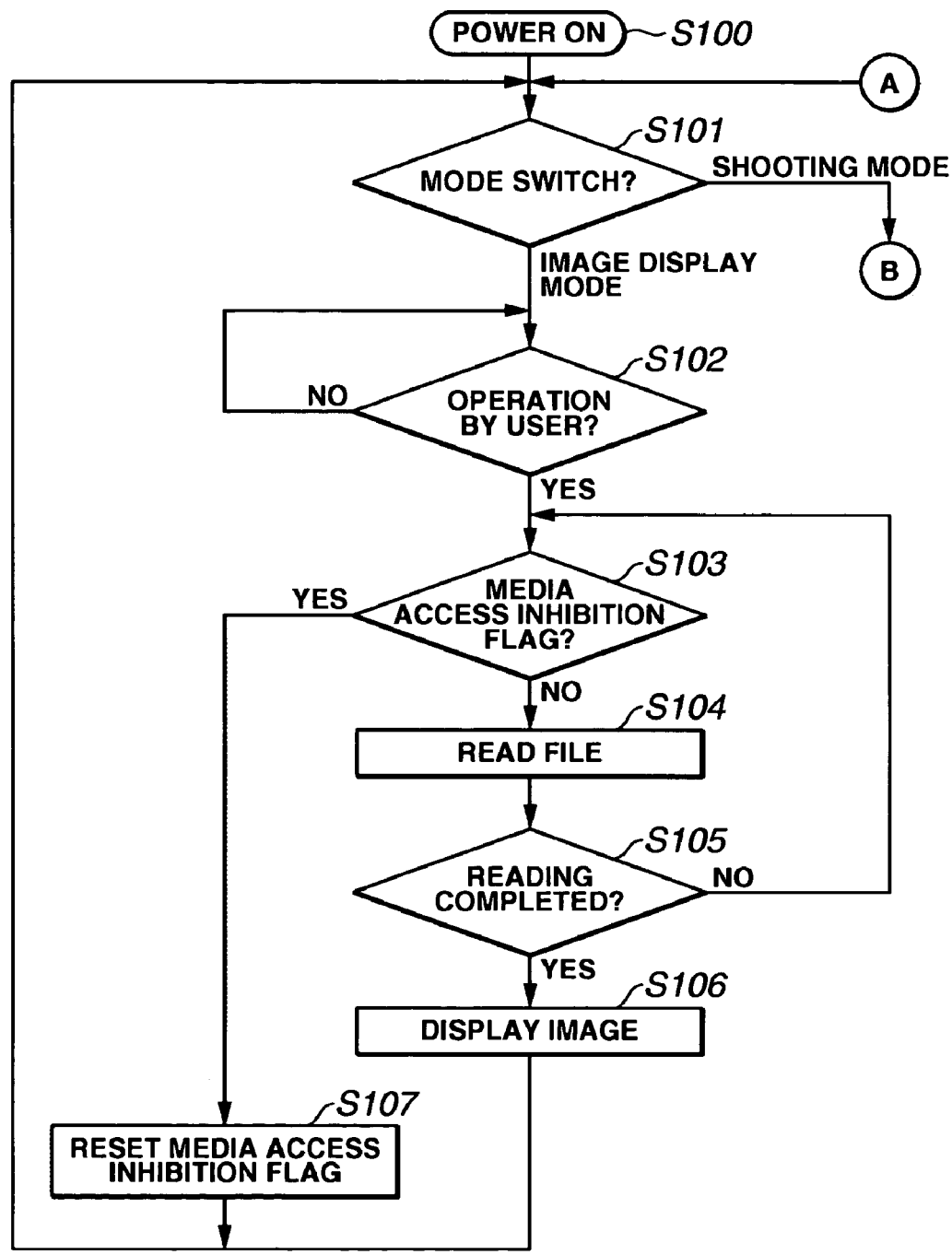
FIG. 3 is a flow chart illustrating the procedures of operation control in a normal mode of the digital camera shown in FIG. 1.
Figure 4:
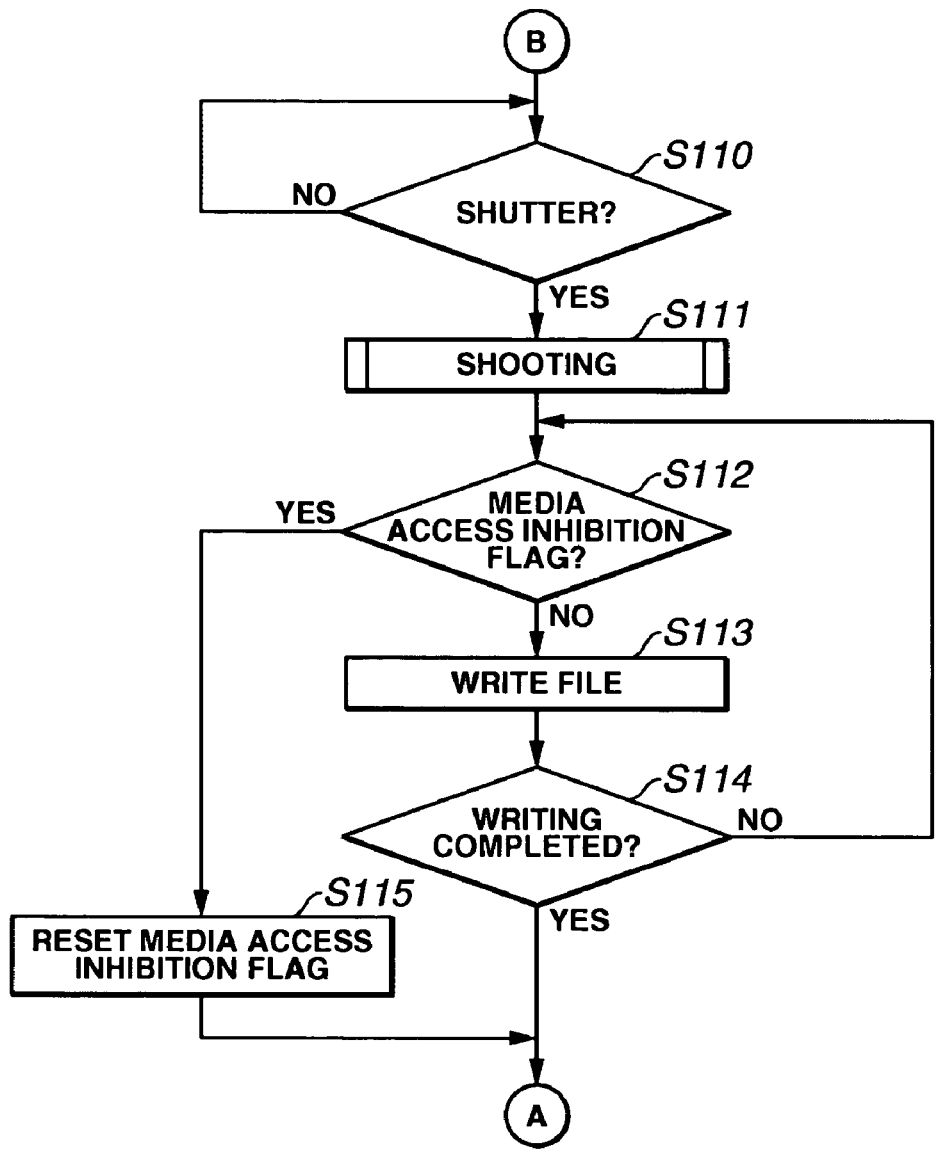
FIG. 4 is a flow chart illustrating the procedures of operation control in the normal mode of the digital camera shown in FIG. 1.
Figure 5:
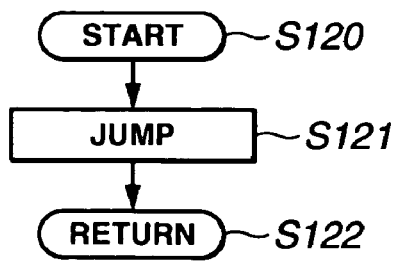
FIG. 5 is a flow chart illustrating the procedures of interrupt processing in the digital camera shown in FIG. 1.
Figure 6:
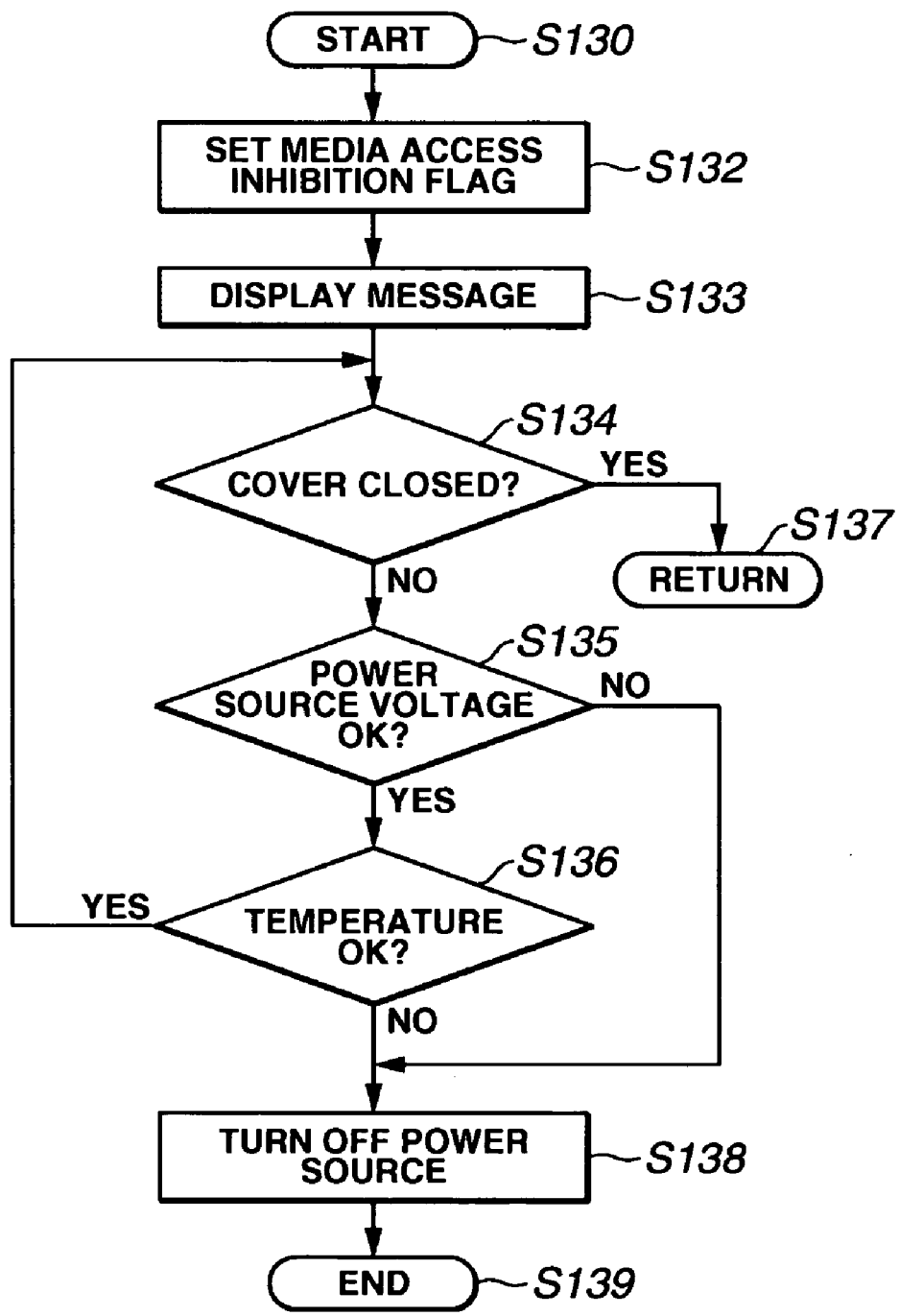
FIG. 6 illustrates processing (performed when the cover of the container portion of the memory card is open) based on a second program stored in a DRAM of the digital camera of FIG. 1.

Operation of the digital camera according to the first embodiment is described below with reference to FIGS. 2 to 6. FIG. 2 is a diagram showing an example of address assignment provided by the system LSI 24 shown in FIG. 1. FIGS. 3 and 4 are flow charts illustrating the procedures of operation control in a normal mode of the digital camera shown in FIG. 1. FIG. 5 is a flow chart illustrating the procedures of interrupt processing in the digital camera shown in FIG. 1. FIG. 6 is a flow chart illustrating the procedures of processing based on a second program stored in the DRAM 6 shown in FIG. 1, i.e., processing performed when the cover 30 of the container portion 31 for the memory card 7 is open.

In the system LSI 24, each block connected to the CPU bus 1 decodes an address and performs an operation, such as register write or register read, with respect to access to the address assigned thereto. The assignment of these addresses is, for example, as shown in FIG. 2.

In the case of the first embodiment, there are two exemplary programs for controlling the digital camera. One is a program for controlling the operation of the digital camera in a normal mode. This program is stored in the ROM 4. The leading address of this program is assigned to 0x00000000. The other program is stored in the DRAM 6 and is executed when the cover 30 for the memory card 7 is open. Since the DRAM 6 is a non-volatile memory, the program stored in the DRAM 6 is transferred from the ROM 4 immediately after the system power source is turned on. The leading address of the program stored in the DRAM 6 is assigned to 0x40000000. In addition, areas for storing captured images and display images, a video RAM area for storing images to be displayed on the display 11, etc., are set on the DRAM 6.

Operation control in a normal mode in the digital camera according to the first embodiment is described below with reference to FIGS. 3 to 5. The procedures shown in FIGS. 3 and 4 are performed by the CPU 3 in accordance with the program stored in the ROM 4 for controlling the operation of the digital camera in the normal mode.

At step S100, when the digital camera is powered on, the CPU 3 checks the operation mode set by the mode switch 21 at step S101, as shown in FIG. 3. The operation mode settable by the mode switch 21 includes a shooting mode for performing a shooting operation and an image display mode for causing image files stored in the memory card 7 to be displayed on the display 11. If the operation mode as set is the shooting mode, the CPU 3 waits for the shutter switch 23 to be operated at step S110 shown in FIG. 4. If the shutter switch 23 is activated by the user, the CPU 3 performs the shooting operation at step S111. In the shooting operation, an object image formed by the lens 19 is converted into an electrical signal by the image capture sensor 9. The electrical signal is converted into a digital image signal by the AD converter 28 and is then supplied to the image capture controller 10. The image capture controller 10 performs processing, such as image processing and data compression, on the supplied digital image signal and then temporarily stores the processed digital image signal in the DRAM 6.

Then, at step S112, the CPU 3 checks to determine if a media access inhibition flag is already set. The media access inhibition flag is a flag indicating that access to the memory card 7 is inhibited. In this instance, since the media access inhibition flag is not yet set, the CPU 3 proceeds to step S113. At step S113, the CPU 3 transfers image data stored in the DRAM 6 to the memory card 7 in units of a predetermined data amount, such as one sector, and writes the image data in the memory card 7.

At step S114, the CPU 3 checks to determine if all the image data stored in the DRAM 6 have been written in the memory card 7. If writing of all the image data is not yet completed, the CPU 3 returns to the above step S112 and repeats processing beginning with the step S112. If it is determined during the process of this loop processing (at step S112) that the media access inhibition flag has been set, the CPU 3 proceeds to step S115. At step S115, the CPU 3 resets the media access inhibition flag and returns the process to step S101. This causes writing of image data in the memory card 7 to be suspended at the above step S112.

If it is determined at step S114 that writing of all the image data has been completed, the CPU 3 returns the process to the above step S101.

If it is determined at step S101 that the image display mode is selected as the operation mode, the CPU 3 waits for the operation switch 22 to be operated by the user at step S102. In this case, the operation switch 22 is assumed to be operated by the user so as to designate an image to be displayed. If the operation switch 22 is operated by the user, the CPU 3 starts reading out an image file designated by the user.

Then, at step S103, the CPU 3 checks to determine if the media access inhibition flag is already set. If it is determined at step S103 that the media access inhibition flag is not yet set, the CPU 3 proceeds to step S104. At step S104, the CPU 3 performs reading of the image file from the memory card 7. Reading of the image file is performed by transferring a data file stored in the memory card 7 to the DRAM 6 in units of predetermined data size. At step S105, the CPU 3 checks to determine if reading, i.e., transfer to the SRAM 6, of all data of the image file has been completed. If it is determined at step S105 that reading of all data of the image file has not yet been completed, the CPU 3 returns to the above step S103 and repeats processing beginning with the step S103. If it is determined during the process of transfer of image data or before transfer of image data (at step S103) that the media access inhibition flag has been set, the CPU 3 proceeds to step S107. At step S107, the CPU 3 resets the media access inhibition flag and returns the process to the above step S101. This causes reading of the image file to be suspended.

If it is determined at step S105 that reading of all data of the image file has been completed, the CPU 3 proceeds to step S106. At step S106, the CPU 3 decompresses, on the DRAM 6, compressed image data read out to the DRAM 6 and transfers the decompressed image data to the display controller 12. The display controller 12 transfers the transferred image data to the display 11 via the DA converter 29. This causes an image represented by the image file read out from the memory card 7 to be displayed on the display 11.

In addition to the program corresponding to the flow charts of FIGS. 3 and 4, a program to be executed when an interrupt request signal is detected is stored in the ROM 4. The interrupt controller 26 receives interrupt request signals from individual blocks. The interrupt request signals include inputs from the I/O 25. One of the inputs from the I/O 25 is an interrupt request signal that becomes active when the cover 30 for the memory card 7 is opened. If any one of the interrupt request signals is detected, the CPU 3 causes the process to skip to interrupt processing. In the interrupt processing, more specifically, as shown in FIG. 5, the CPU 3 first starts processing at step S120. At the next step S121, the CPU 3 causes the process to jump to 0x40000000, which is the leading address of the second program stored in the DRAM 6. Then, at step S122, the CPU 3 exits from this processing.

Processing to be performed according to the second program stored in the DRAM 6, i.e., processing to be performed when the cover 30 of the container portion 31 for the memory card 7 is open, is described below with reference to FIG. 6.

If the open state of the cover 30 of the container portion 31 for the memory card 7 is detected, the CPU 3 starts processing at step S130, as shown in FIG. 6. At step S132, the CPU 3 sets the media access inhibition flag. Accordingly, access to the memory card 7 is inhibited.

Then, at step S133, the CPU 3 causes a message indicative of the open state of the cover 30 to be displayed on the display 11. For example, a message "Cover is Open" is displayed on the display 11. This display notifies the user that the cover 30 is open and that the digital camera is suspending processing such as access to the memory card 7, image capturing and image display.

At step S134, the CPU 3 checks to determine if the cover 30 has been closed, on the basis of a detection signal from the cover detection switch 18. If the cover 30 is in the open state, the CPU 3 proceeds to step S135. At step S135, the CPU 3 checks to determine if a power source voltage is above a predetermined value. If yes, the CPU 3 proceeds to step S136, where the CPU 3 checks to determine if the temperature inside the digital camera is within a predetermined range. If temperature is within the predetermined range, the CPU 3 returns the process to the above step S134.

If it is determined at the step S135 that the power source voltage is not above the predetermined value, or if it is determined at the step S136 that temperature inside the digital camera is not within the predetermined range, the CPU 3 proceeds to step S138. At step S138, the CPU 3 shuts off the power source of the digital camera, and, at step S139, brings the process to an end.

If cover 30 is closed at step S134, the CPU 3 exits processing at step S137 and returns from the second program to the interrupt processing process (step S120 of FIG. 5) of the first program. Accordingly, the CPU 3 program counter returns to instructions that were previously executed upon detection of an interrupt request, and the CPU 3 then continues processing. However, since the media access inhibition flag remains set, if the cover 30 is opened during access to the memory card 7 by the first program, access to the memory card 7 is suspended. Thus, until the cover 30 is closed, the CPU 3 executes the program stored in the DRAM 6 and does not access the ROM 4. Consequently, even when noise occurs at the ROM bus 20 when the memory card 7 is removed, the digital camera operation remains relatively unaffected.

Furthermore, since read or write access to memory card 7 is processed in predetermined data units (e.g., per sector), the total time corresponding to the data unit is required. The total time is measured from when the cover 30 is opened to when access to the memory card 7 actually ends. However, this time is at least several milliseconds because extraction of the memory card 7 is performed manually by the user. Accordingly, memory access for every unit can be completed within at least several milliseconds.

As described above, in the digital camera according to the first embodiment, as long as the cover 30 of the container portion 31 for the memory card 7 is open, the CPU 3 is prevented from accessing the ROM 4. Therefore, even if an unexpected signal, for example, noise, is caused at the ROM 4 by insertion or extraction of the memory card 7, the CPU 3 does not access the ROM 4, so that the system remains stable and does not crash or hang up. Accordingly, the memory card 7 and the ROM 4 can have one and the same bus in common without using any integrated circuit, such as a bus transceiver. As a result, a reduction in size and cost of the digital camera can be realized.

It should be noted that the first embodiment can be implemented with image input apparatuses other than digital cameras (for example, digital video cameras, camera integrated mobile phones and camera integrated portable terminals).

Second Embodiment

Figure 8:
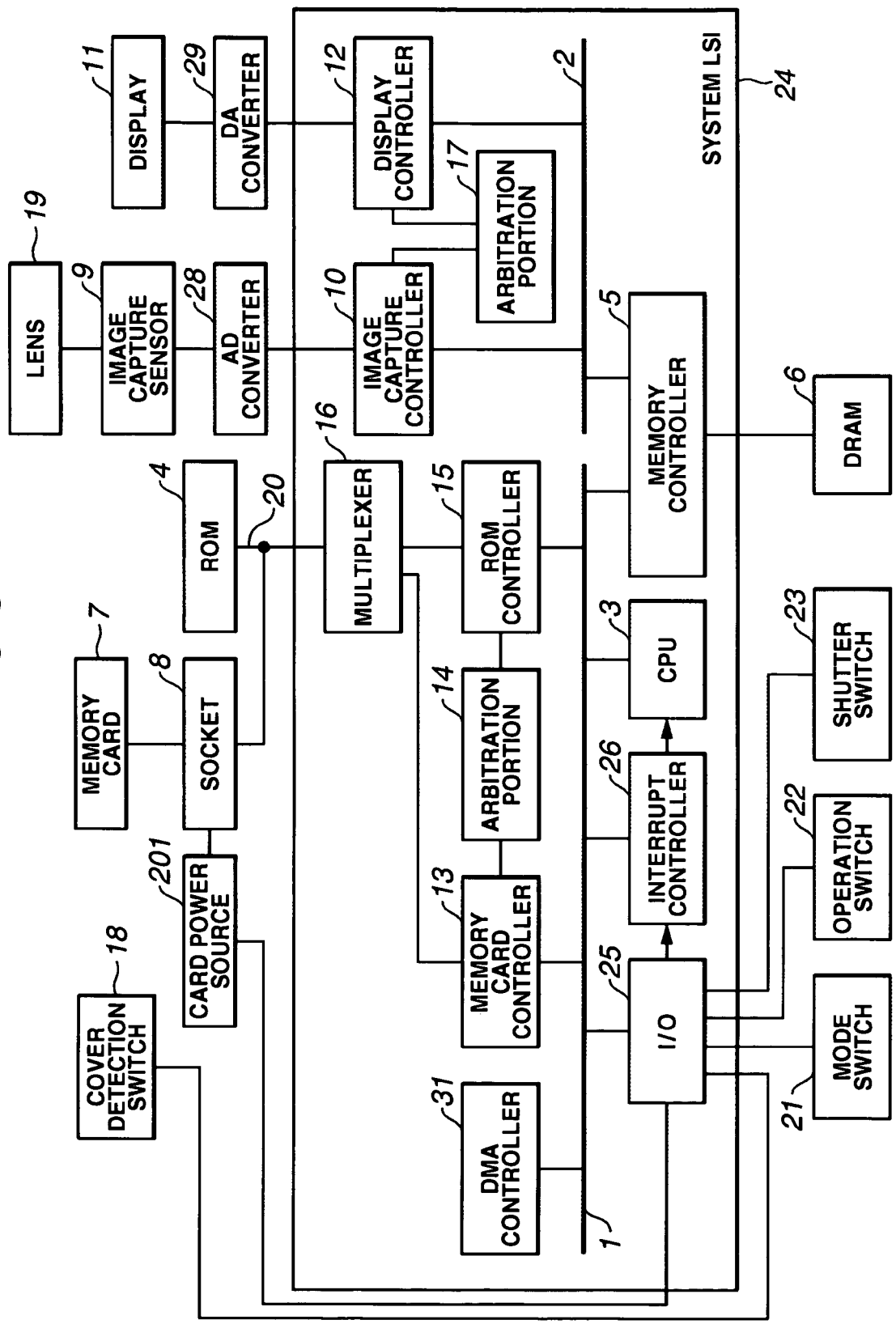
FIG. 8 is a block diagram showing the construction of a digital camera according to a second embodiment of the invention.
Figure 9:
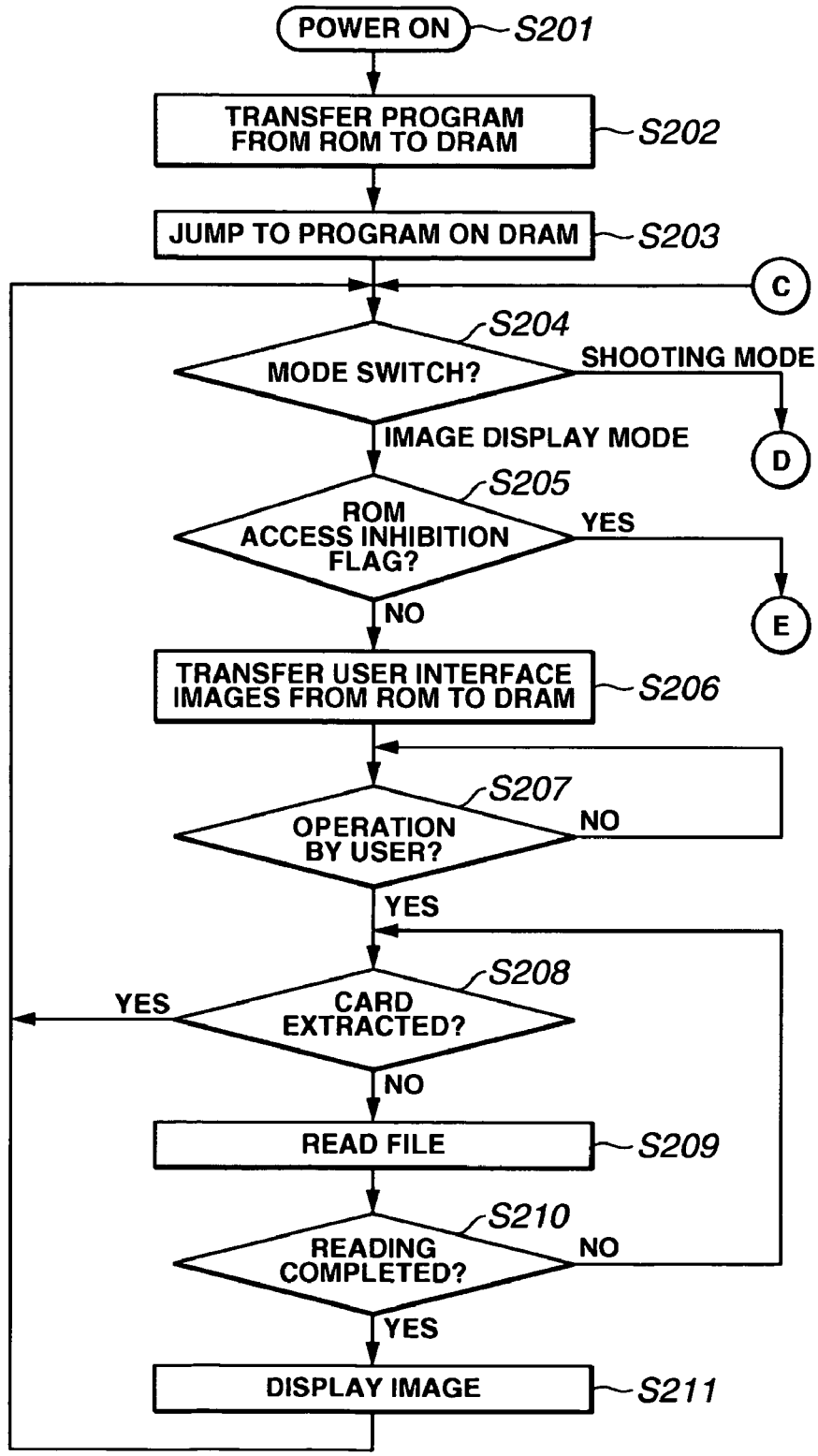
FIG. 9 is a flow chart illustrating the procedures of operation control in a normal mode of the digital camera according to the second embodiment.
Figure 10:
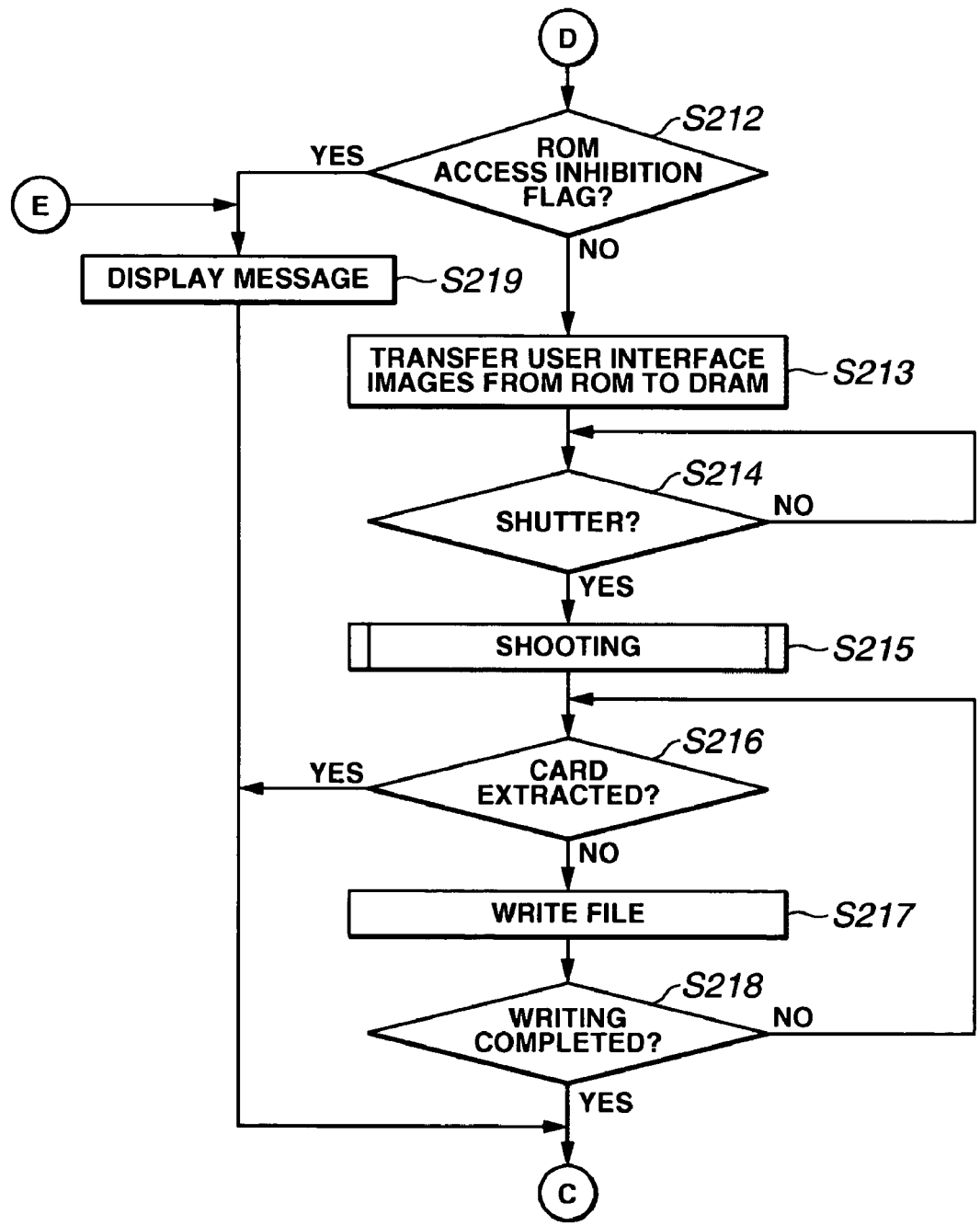
FIG. 10 is a flow chart illustrating the procedures of operation control in the normal mode of the digital camera according to the second embodiment.
Figure 11:
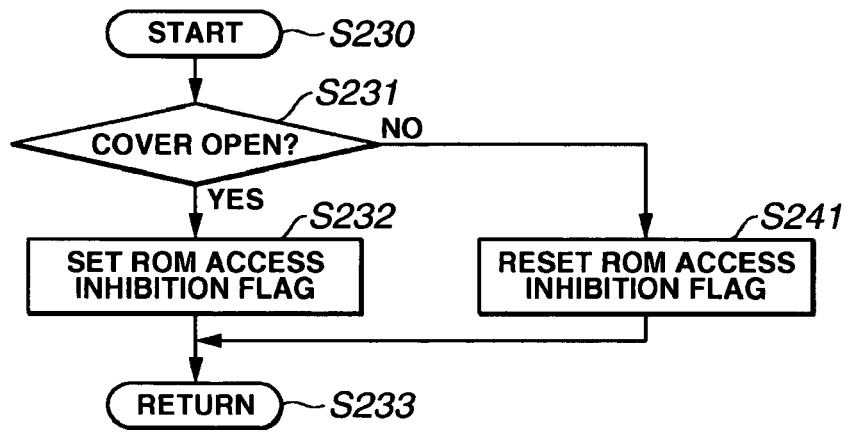
FIG. 11 illustrates the procedures for setting or resetting a ROM access inhibition flag in the second embodiment.

A second embodiment of the invention is described below with reference to FIGS. 8 to 11. FIG. 8 is a block diagram showing the construction of a digital camera which is an example of an image input apparatus according to the second embodiment. FIGS. 9 and 10 are flow charts illustrating the procedures of operation control in a normal mode of the digital camera according to the second embodiment. FIG. 11 is a flow chart illustrating the procedures of processing for setting or resetting a ROM access inhibition flag in the second embodiment.

As shown in FIG. 8, in the second embodiment, a card power source 201 is connected to the I/O 25 and supply of electric power from the card power source 201 to the memory card 7 is controlled by the CPU 3 and the entire program stored in the ROM 4 (operation control programs in the normal mode) is transferred to the DRAM 6. In the second embodiment, the same blocks as those shown in FIG. 1 are denoted by the same reference numerals and are omitted from the following discussion.

Operation control in the normal mode of the digital camera according to the second embodiment is described below with reference to FIGS. 9 and 10. The procedures shown in FIGS. 9 and 10 are performed by the CPU 3 in accordance with the program stored in the ROM 4 for controlling the operation in the normal mode of the digital camera.

If the power source of the digital camera is turned on at step S201, the CPU 3 first transfers a program stored in the ROM 4 to the DRAM 6 at step S202, as shown in FIG. 9. In this regard, however, user interface images, such as icon images, for use in a menu, etc., to be displayed for the user at the time of shooting or image display are not transferred to the DRAM 6. This is because an area for storing image data in the DRAM 6 is required to be kept large, so that the number of shootable frames in a continuous shooting operation or the switching speed of images in an image display mode can be increased. At step S203, the CPU 3 causes the process to jump to the program transferred to the DRAM 6. After this, the CPU 3 begins to acquire instructions from the DRAM 6 and not from the ROM 4 although in exceptional cases, the CPU 3 may acquire instructions from the ROM 4. For example, in cases where a menu is displayed on the display 11, user interface images, such as icon images, for use in displaying the menu are transferred from the ROM 4 to the DRAM 6 on a case-by-case basis. The reason for this is as follows. Since the data size of a user interface image such as an icon image is relatively large, if all of the various icon images, for example, are previously transferred to the DRAM 6, the free space of the DRAM 6 becomes small. In such a situation that the free space of the DRAM 6 is small, the number of shootable frames in a continuous shooting operation, for example, becomes small, thereby lowering the performance of the digital camera. Therefore, user interface images, such as icon images, for use in displaying a menu are normally stored in the ROM 4, although required images may be transferred to the DRAM 6 when needed.

At step S204, the CPU 3 checks to determine which of the shooting mode and the image display mode is selected as the operation mode in response to the operation of the mode switch 21. If the shooting mode is selected, the CPU 3 proceeds to step S212 shown in FIG. 10. At step S212, the CPU 3 checks to determine if a ROM access inhibition flag is already set. The ROM access inhibition flag is a flag indicating that access to the ROM 4 is inhibited in the case where the cover 30 of the container portion 31 for the memory card 7 is open. If it is determined at step S212 that the ROM access inhibition flag is not set as the cover 30 is not open, the CPU 3 proceeds to step S213. At step S213, the CPU 3 transfers user interface images to be displayed on the display 11 from the ROM 4 to a video RAM area of the DRAM 6. This causes the user interface images to be displayed on the display 11. Specifically, to prevent data read out from the ROM 4 from changing due to noise caused at the ROM bus 20 by insertion or extraction of the memory card 7 during access to the ROM 4, the user interface images may be transferred from the ROM 4 to the DRAM 6 in the case where the ROM access inhibition flag is not set.

At step S214, the CPU 3 checks to determine if the shutter switch 23 has been operated. If the shutter switch 23 has been operated, the CPU 3 proceeds to step S215. At step S215, the CPU 3 performs a shooting operation. After completion of the shooting operation, the CPU 3 proceeds to step S216. At step S216, in order to transfer compressed image data stored in the DRAM 6 to the memory card 7, the CPU 3 checks to determine if the memory card 7 is currently mounted on the socket 8. The socket 8 is provided with a card detection terminal. The CPU 3 makes the above check by using the card detection terminal. If it is determined at step S216 that the memory card 7 is currently mounted on the socket 8, the CPU 3 proceeds to step S217. At step S217, the CPU 3 transfers image data stored in the DRAM 6 to the memory card 7 in units of a predetermined data amount, and writes the image data in the memory card 7. At step S218, the CPU 3 checks to determine if all of the image data have been transferred to the memory card 7. If all of the image data have not yet been transferred to the memory card 7, the CPU 3 returns the process to the above step S216, and repeats processing beginning with the step S216. If it is determined at step S218 that transfer of all of the image data to the memory card 7 has been competed, the CPU 3 returns the process to the above step S204. If, at step S216, the memory card 7 is removed during the process of transferring the image data from the DRAM 6 to the memory card 7, the CPU 3 returns the process to the above step S204, thereby suspending writing of data in the memory card 7.

If it is determined at the above step S212 that the ROM access inhibition flag is already set, the CPU 3 proceeds to step S219. At step S219, the CPU 3 causes a message indicative of the open state of the cover 30 to be displayed on the display 11. Then, the CPU 3 returns the process to the above step S204.

If it is determined at the above step S204 that the image display mode is selected, the CPU 3 proceeds to step S205. At step S205, the CPU 3 checks to determine if the ROM access inhibition flag is already set. If the ROM access inhibition flag is not yet set, the CPU 3 proceeds to step S206. At step S206, the CPU 3 transfers user interface images from the ROM 4 to the DRAM 6. The user interface images inform the user of an operation method of the digital camera. The user interface images are displayed on the display 11 after being transferred to the video RAM area of the DRAM 6.

Then, at step S207, the CPU 3 waits for the operation switch 22 to be operated by the user. In this case, the operation switch 22 is assumed to be operated by the user so as to designate a predetermined image file recorded on the memory card 7 to be displayed on the display 11. If the operation switch 22 is operated by the user, the CPU 3 proceeds to step S208. At step S208, the CPU 3 checks to determine if the memory card 7 is currently mounted, by using the card detection terminal provided in the socket 8. If the memory card 7 is currently mounted, the CPU 3 proceeds to step S209. At step S209, the CPU 3 reads out an image file recorded on the memory card 7 and transfers the read-out image file to the video RAM area of the DRAM 6. Transfer of the image file is performed by transferring data in units of a predetermined data amount. Then, at step S210, the CPU 3 checks to determine if reading of the image file has been completed. If reading of the image file has not yet been completed, the CPU 3 returns the process to the above step S208 and repeats processing beginning with the step S208. If reading of the image file has been completed, the CPU 3 proceeds to step S211. At step S211, the CPU 3 drives and controls the display controller 12 to cause the read-out image file to be displayed on the display 11.

If it is determined at the above step S208 that the memory card 7 has been removed during the process of transferring the image file, the CPU 3 returns the process to the above process S204, thereby suspending reading of the image file from the memory card 7.

If it is determined at the above step S205 that the ROM access inhibition flag is already set, the CPU 3 proceeds to step S219 shown in FIG. 10. At step S219, the CPU 3 causes a message indicative of the open state of the cover 30 to be displayed on the display 11. Then, the CPU 3 returns the process to the above step S204.

Processing for setting or resetting of the ROM access inhibition flag is now described below with reference to FIG. 11.

If the cover 30 of the container portion 31 for the memory card 7 is opened when the digital camera is in the operative condition, opening of the cover 30 is detected by the cover detection switch 18. Then, an interrupt request signal is supplied from the interrupt controller 26 to the CPU 3. In response to the interrupt request signal, the CPU 3 starts interrupt processing at step S230, as shown in FIG. 11. At step S231, in order to again confirm the open or closed state of the cover 30, the CPU 3 checks to determine if the cover 30 is open, on the basis of a detection signal from the cover detection switch 18. If the cover 30 is open, the CPU 3 proceeds to step S232. At step S232, the CPU 3 sets the ROM access inhibition flag. Then, at step S233, the CPU 3 exits from this processing and returns to processing performed before the start of interrupt processing.

If closing of the cover 30 is detected by the cover detection switch 18, an interrupt request signal is supplied from the interrupt controller 26 to the CPU 3. In response to the interrupt request signal, the CPU 3 starts interrupt processing at step S230, as shown in FIG. 11. At step S231, in order to again confirm the open or closed state of the cover 30, the CPU 3 checks the cover 30 using a detection signal from the cover detection switch 18. If the cover 30 is closed, the CPU 3 proceeds to step S241. At step S241, the CPU 3 resets the ROM access inhibition flag. Then, at step S233, the CPU 3 exits from this processing and returns to processing performed before the start of interrupt processing.

If the cover 30 of the container portion 31 for the memory card 7 is opened during the process of transferring the image data, access to the ROM 4 cannot be suspended unless access for one unit is completed. This is because access to the ROM 4 is performed in units of a predetermined data amount, for example, one icon image. However, since opening of the cover 30 to remove the memory card 7 is manually performed by the user, a length of time of at least several milliseconds is required for this operation. Therefore, access to the ROM 4 can be inhibited before the memory card 7 is removed.

Note that the control of data transfer from the ROM 4 to the DRAM 6 can be performed by using the DMA controller 31. In this case, the DMA controller 31 is activated by the CPU 3. The CPU 3 confirms the set or reset state of the ROM access inhibition flag before activating the DMA controller 31. If the ROM access inhibition flag is already set, the CPU 3 investigates the cause of setting of the ROM access inhibition flag. If the ROM access inhibition flag has been set due to the open state of the cover 30 of the container portion 31 for the memory card 7, a message indicative of such a cause is displayed on the display 11 so as to request the user to close the cover 30. If the ROM access inhibition flag has been set due to the shut-off of a power source for the memory card 7, the supply of electric power from the card power source 201 to the memory card 7 is started. Then, after confirming that the cover 30 has been closed and electric power is being supplied to the memory card 7, the CPU 3 activates the DMA controller 31. This enables data transfer from the ROM 4 to the DRAM 6 to be attained.

In accordance with the second embodiment of the digital camera, the entire operation control program for use in the normal mode is transferred to the DRAM 6. In addition, even in cases where the ROM 4 is accessed to fetch user interface images, access to the ROM 4 is inhibited when the memory card 7 is removed. Accordingly, the system of the digital camera can be prevented from hanging up due to noise caused by insertion or extraction of the memory card 7. In addition, since any device, such as a bus transceiver, is not required between the memory card 7 and the ROM bus 20, a reduction in size and cost of the digital camera can be realized.

It should be noted that as in the first embodiment, the second embodiment can also be implemented with image input apparatuses other than digital cameras (for example, digital video cameras, camera integrated mobile phones and camera integrated portable terminals).

Third Embodiment

Figure 12:
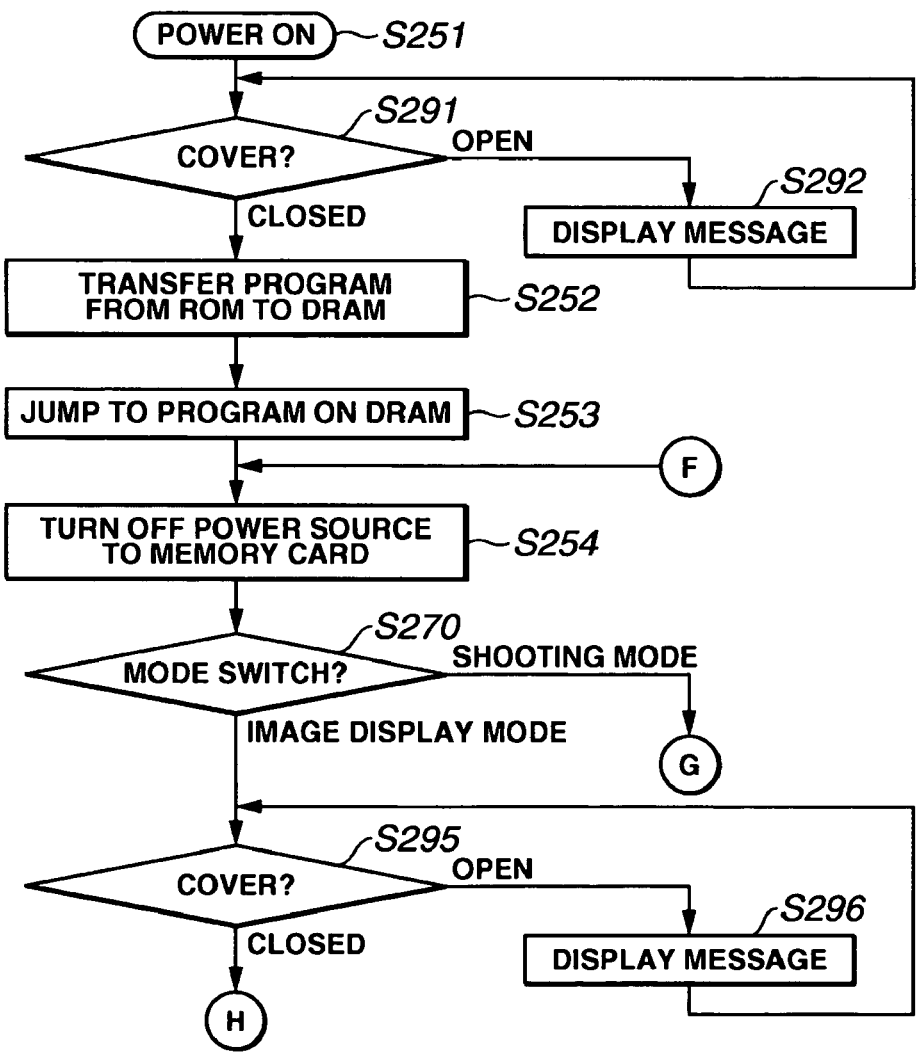
FIG. 12 is a block diagram showing the construction of a digital camera according to a third embodiment of the invention.
Figure 13:
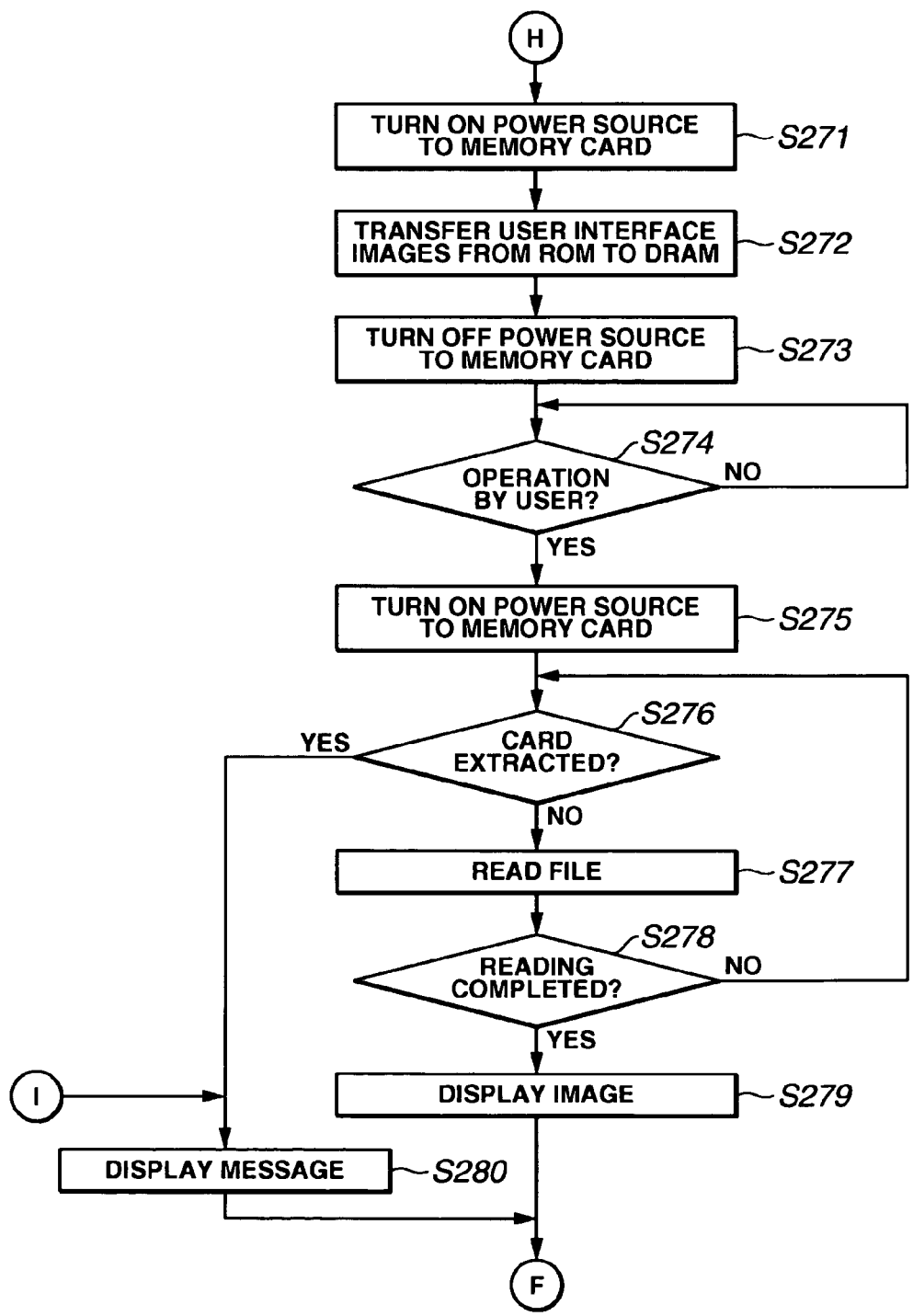
FIG. 13 is a flow chart illustrating the procedures of operation control in a normal mode of the digital camera according to the third embodiment.
Figure 14:
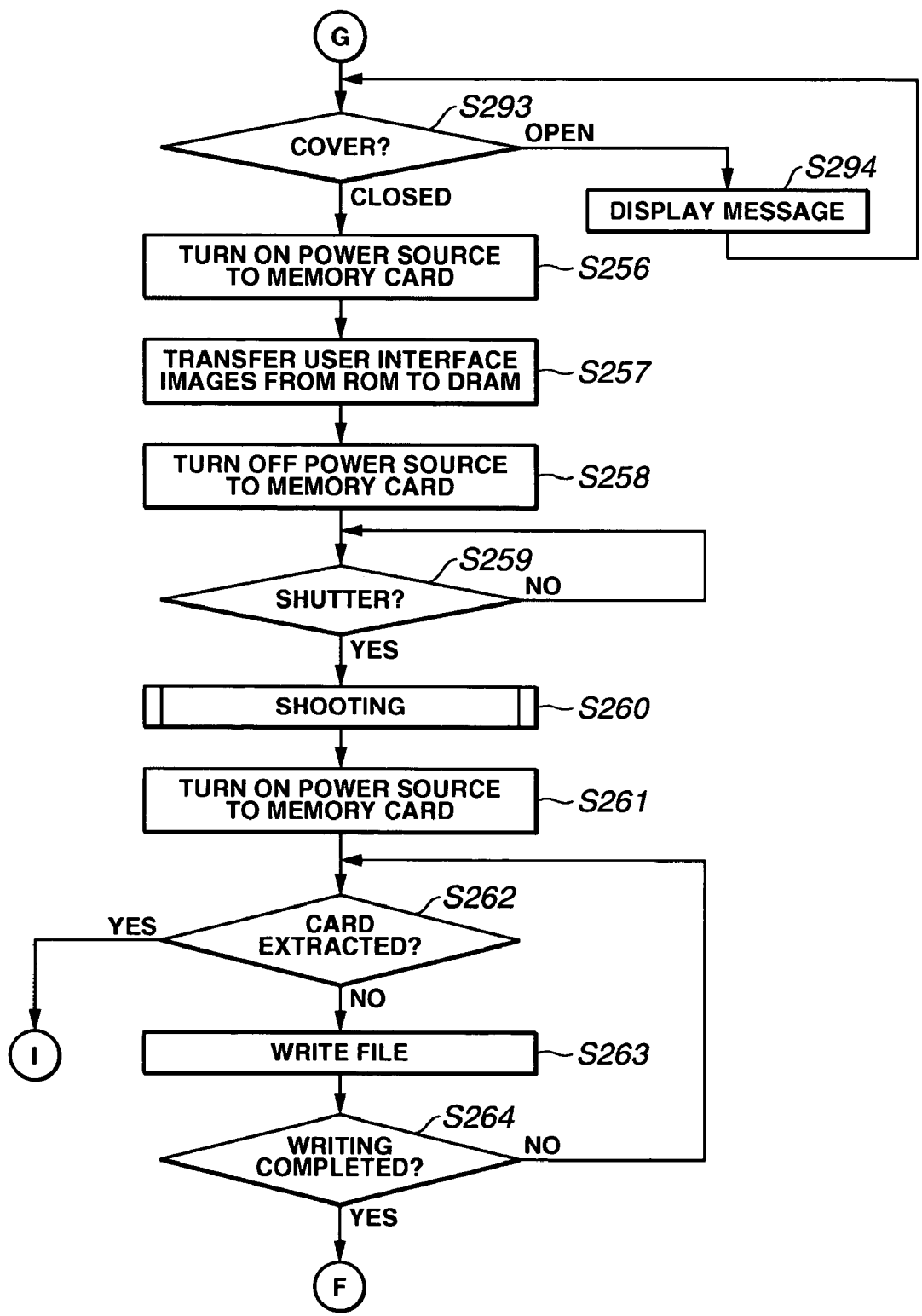
FIG. 14 is a flow chart illustrating the procedures of operation control in the normal mode of the digital camera according to the third embodiment.

A third embodiment of the invention is described below with reference to FIGS. 12 to 14. FIGS. 12 to 14 are flow charts illustrating the procedures of operation control in a normal mode of a digital camera which is an example of an image input apparatus according to the third embodiment. The third embodiment has the same construction as that of the second embodiment, which is, therefore, omitted from the following discussion.

In the third embodiment, when the cover 30 is closed in the normal mode, power supply to the memory card 7 is started.

When a power source of the digital camera is turned on, the CPU 3 starts processing at step S251, as shown in FIG. 12. Then, at step S291, the CPU 3 checks for the open or closed state of the cover 30 of the container portion 31 for the memory card 7 on the basis of a detection signal from the cover detection switch 18. If the cover 30 is in the open state, the CPU 3 proceeds to step S292. At step S292, the CPU 3 causes a message prompting a user to close the cover 30 to be displayed on the display 11, and returns the process to the step S291.

If the cover 30 is in the closed state, the CPU 3 proceeds to step S252. At step S252, the CPU 3 transfers a camera control program stored in the ROM 4 to the DRAM 6. At the next step S253, the CPU 3 causes a program execution address to jump to the leading address of the program on the DRAM 6. Then, at step S254, the CPU 3 shuts off power supply to the memory card 7 by controlling the card power source 201 via the I/O 25.

At the next step S270, the CPU 3 checks for the operation mode selected by the mode switch 21. If the shooting mode is selected as the operation mode, the CPU 3 proceeds to step S293 shown in FIG. 14. At step S293, the CPU 3 checks for the open or closed state of the cover 30 of the container portion 31 for the memory card 7. If the cover 30 is in the open state, the CPU 3 proceeds to step S294. At step S294, the CPU 3 causes a message prompting the user to close the cover 30 to be displayed on the display 11, and returns the process to the step S293.

If the cover 30 is in the closed state, the CPU 3 proceeds to step S256. At step S256, the CPU 3 supplies electric power to the memory card 7 by controlling the card power source 201 via the I/O 25. At the next step S257, the CPU 3 transfers user interface images from the ROM 4 to the DRAM 6. The user interface images are images used to display, in a user-friendly manner, parameters required at the time of shooting, for example, aperture, shutter speed, white balance, etc. The user interface images are transferred to the video RAM area of the DRAM 6 so as to be displayed on the display 11. At step S258, the CPU 3 shuts off power supply to the memory card 7 by controlling the card power source 201 via the I/O 25. The CPU 3 temporarily supplies electric power to the memory card 7 when transferring data from the ROM 4 to the DRAM 6, otherwise, the memory card 7 causes the ROM bus 20 to go low. When electric power is being supplied to the memory card 7, the ROM bus 20 is kept at high level unless read access to the memory card 7 is performed, so that access to the ROM 4 can be performed.

At the next step S259, the CPU 3 waits for the shutter switch 23 to be operated by the user. If the user has operated the shutter switch 23, the CPU 3 proceeds to step S260. At step S260, the CPU 3 performs a shooting operation. Then, at step S261, the CPU 3 starts power supply to the memory card 7.

At the next step S262, the CPU 3 checks to determine if the memory card 7 has been removed from the socket 8, by using a card detection terminal provided on the socket 8. If the memory card 7 has not been removed, the CPU 3 proceeds to step S263. At step S263, the CPU 3 transfers image data stored in the DRAM 6 to the memory card 7 in units of a predetermined data amount. At the next step S264, the CPU 3 checks to determine if transfer of image data to the memory card 7 has been completed. If transfer of all of the image data to the memory card 7 has not yet been completed, the CPU 3 returns the process to the step S262 and repeats processing beginning with the step S262. If transfer of all of the image data to the memory card 7 has been completed, the CPU 3 returns the process to the above step S254 and repeats processing beginning with the step S254.

If the memory card 7 has been removed during the process of transferring data to the memory card 7 (at step S262), the CPU 3 proceeds to step S280 shown in FIG. 13. At step S280, the CPU 3 causes a message indicating that the memory card 7 is not mounted to be displayed on the display 11, and returns the process to the above step S254. This causes writing of data in the memory card 7 to be suspended.

If it is determined at the above step S270 (shown in FIG. 12) that the operation mode selected by the mode switch 21 is the image display mode, the CPU 3 proceeds to step S295. At step S295, the CPU 3 checks for the open or closed state of the cover 30 of the container portion 31 for the memory card 7. If the cover 30 is in the open state, the CPU 3 proceeds to step S296. At step S296, the CPU 3 causes a message prompting the user to close the cover 30 to be displayed on the display 11, and returns the process to the step S295.

If the cover 30 is in the closed state, the CPU 3 proceeds to step S271 shown in FIG. 13. At step S271, the CPU 3 supplies electric power to the memory card 7 by controlling the card power source 201 via the I/O 25. Then, at step S272, the CPU 3 transfers user interface images stored in the ROM 4 to the DRAM 6. These user interface images are images used to display an operation method, such as a method for changing image files displayed in the image display mode, together with an image on the display 11.

At the next step S273, the CPU 3 shuts off power supply to the memory card 7. The CPU 3 temporarily supplies electric power to the memory card 7 when transferring data from the ROM 4 to the DRAM 6, otherwise, the ROM bus 20 comes into a high-impedance state, thereby enabling access to the ROM 4. Then, at step S274, the CPU 3 waits for the operation switch 23 to be operated by the user. This operation by the user is performed to give instructions for display of an image or display of the next image. In this instance, it is assumed in the following discussion that the user gives instructions for display of an image.

If instructions for display of an image are given by the user, the CPU 3 proceeds to step S275. At step S275, the CPU 3 starts power supply to the memory card 7. Then, at step S276, the CPU 3 checks to determine if the memory card 7 has been removed, on the basis of the card detection terminal provided on the socket 8. If the memory card 7 has not been removed, the CPU 3 proceeds to step S277. At step S277, the CPU 3 reads out an image file recorded on the memory card 7 and transfers the read-out image file to the video RAM area of the DRAM 6. This transfer of the image file is performed in units of a predetermined data amount.

At the next step S278, the CPU 3 checks to determine if reading of the image file has been completed. If this reading has not yet been completed, the CPU 3 returns the process to the step S276. If reading of the image file has been completed, the CPU 3 proceeds to step S279. At step S279, the CPU 3 drives the display controller 12 so as to display the read-out image on the display 11, and returns the process to the above step S254.

If the memory card 7 has been removed during the process of reading out the image file (at step S276), the CPU 3 proceeds to step S280. At step S280, the CPU 3 causes a message indicating that the memory card 7 is not mounted to be displayed on the display 11, and returns the process to the above step S254.

As described above, in the digital camera according to the third embodiment, if the need to read out user interface images or the like from the ROM 4 arises, power supply to the memory card 7 starts before the start of access to the ROM 4. When reading of data from the ROM 4 has been completed, power supply to the memory card 7 stops. Accordingly, when electric power is not being supplied to the memory card 7, the problem wherein the memory card 7 makes the ROM bus 20 go low, thereby causing data read out from the ROM 4 to become erroneous, can be avoided.

Furthermore, in the digital camera according to the third embodiment, when the memory card 7 is removed, access to the ROM 4 is inhibited. Accordingly, the system of the digital camera can be prevented from hanging up due to noise caused by insertion or extraction of the memory card 7.

It should be noted that, similarly to the first embodiment, the third embodiment can also be implemented with image input apparatuses other than digital cameras (for example, digital video cameras, camera integrated mobile phones and camera integrated portable terminals).

Fourth Embodiment

Figure 15:
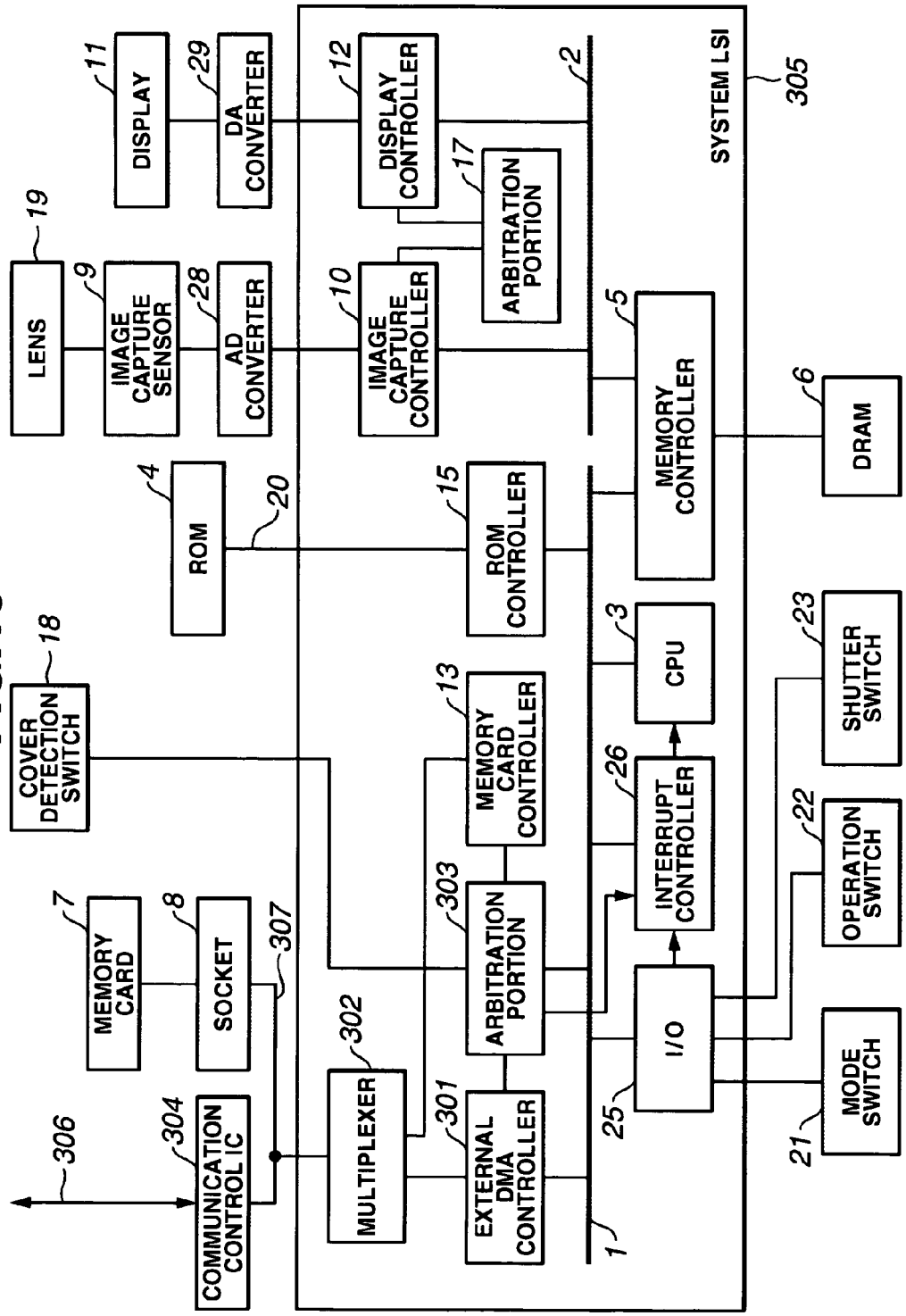
FIG. 15 is a block diagram showing the construction of a digital camera according to a fourth embodiment of the invention.
Figure 16:
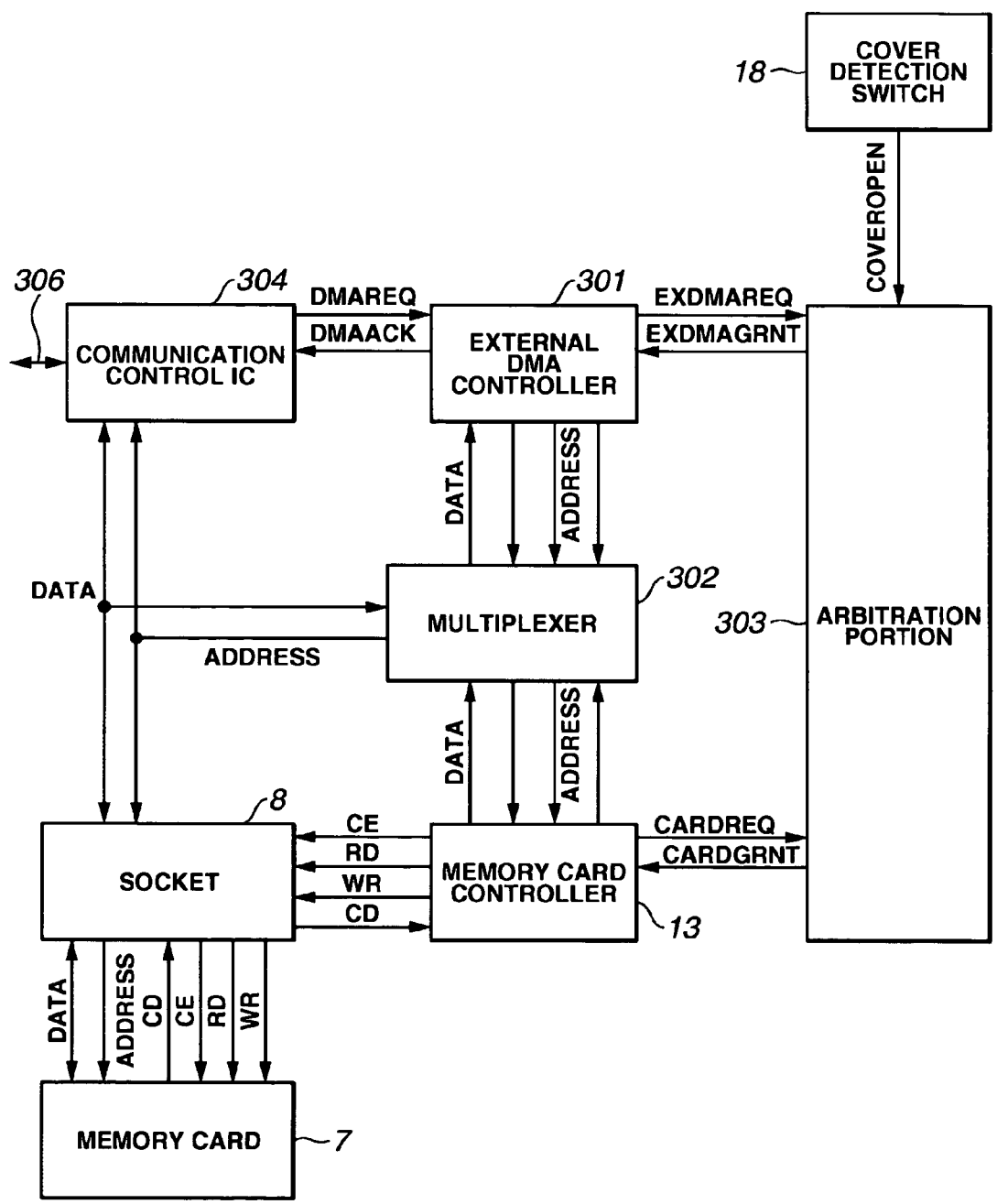
FIG. 16 shows connection signals between various components including the communication control IC 304 and the memory card controller 13 of FIG. 15.
Figure 17:
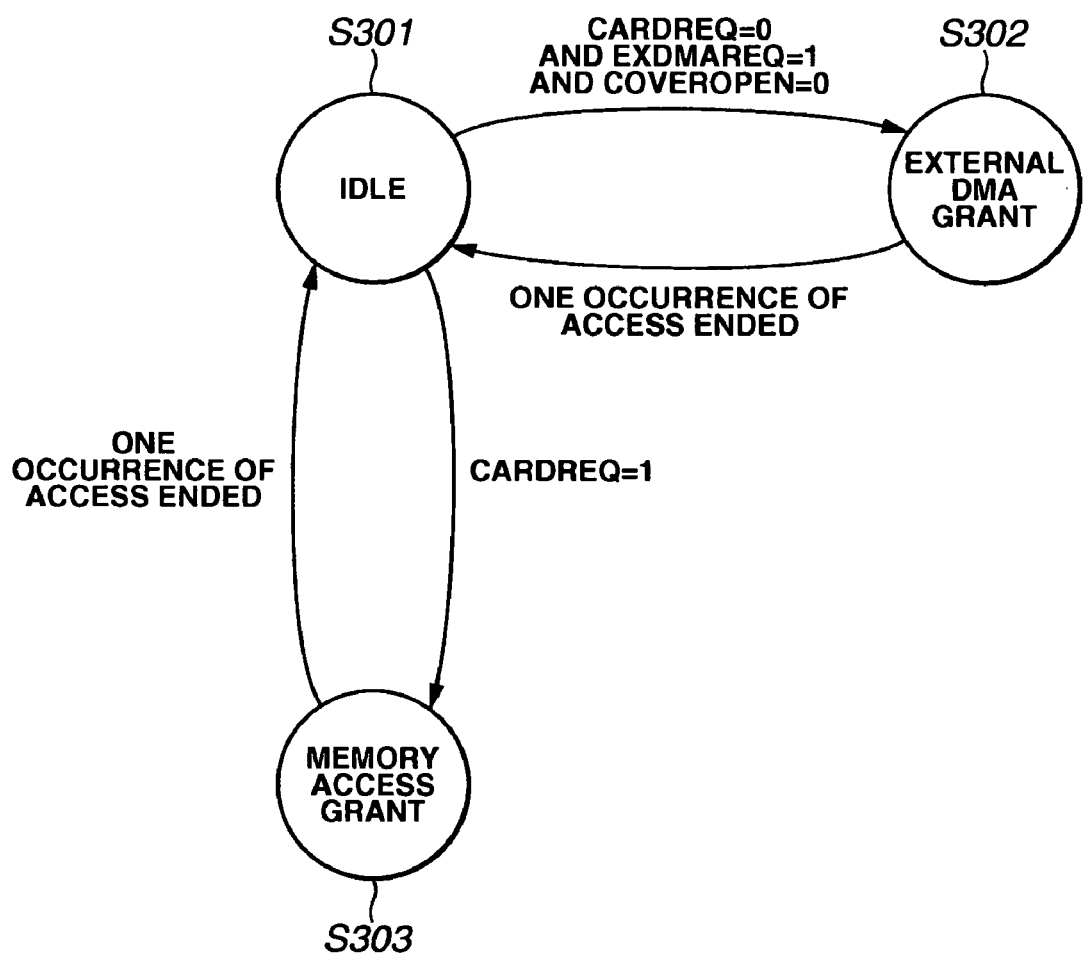
FIG. 17 is a diagram showing the transition of operation of an arbitration portion 303 shown in FIG. 15.
Figure 18:
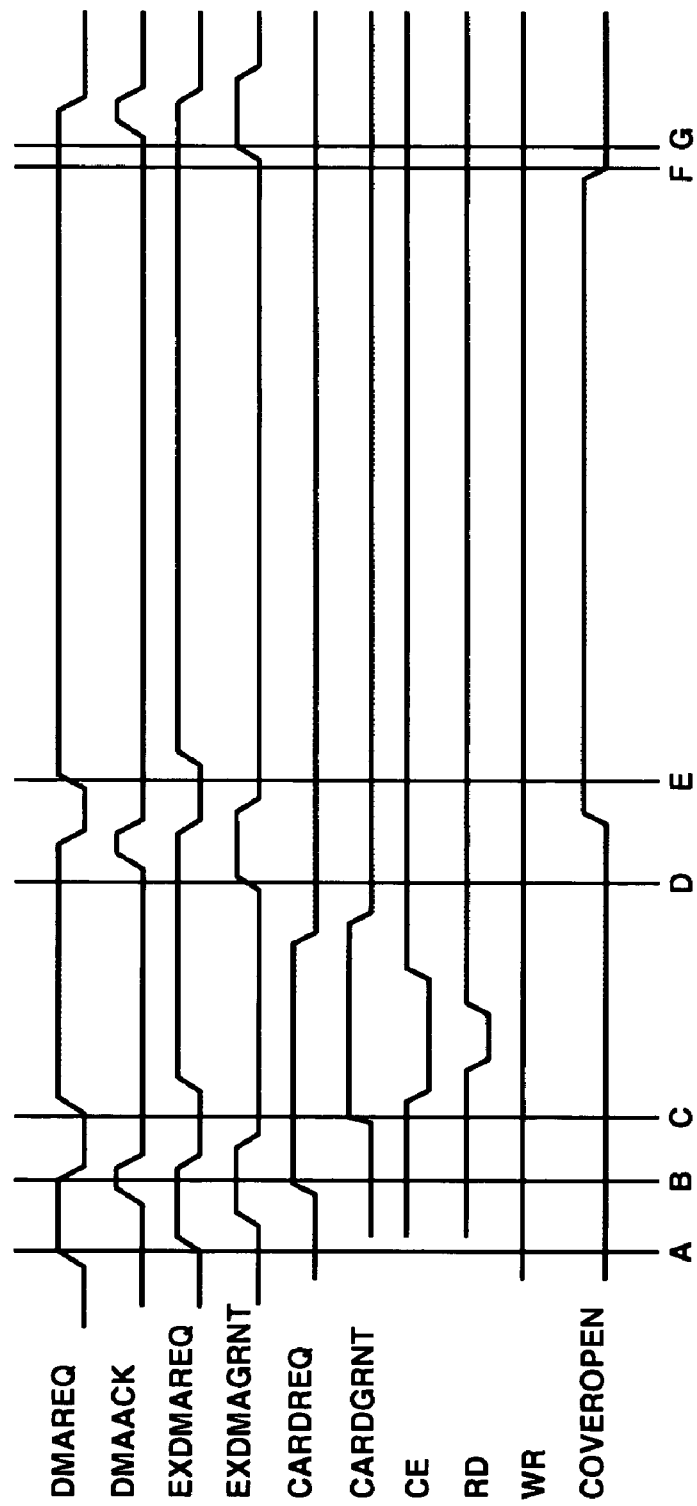
FIG. 18 is a diagram showing signal waveforms occurring around the arbitration portion 303 shown in FIG. 17.
Figure 19:
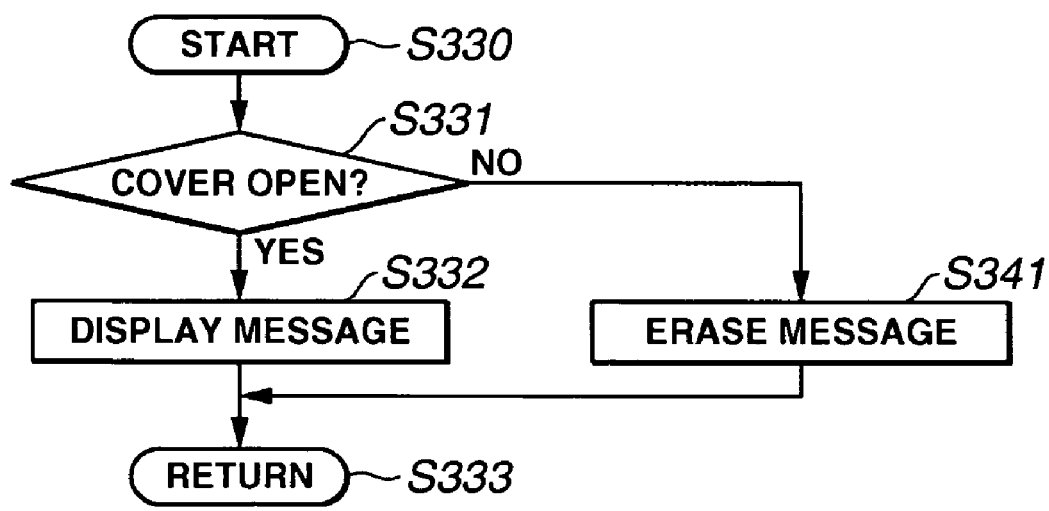
FIG. 19 illustrates procedures associated with open and closed states of the cover in the digital camera of FIG. 15.

A fourth embodiment of the invention is described below with reference to FIGS. 15 to 19. FIG. 15 is a block diagram showing the construction of a digital camera, which is an example of an image input apparatus according to the fourth embodiment. FIG. 16 shows connection signals between various components including the communication control IC 304 and the memory card controller 13 of FIG. 15. FIG. 17 is a diagram showing the transition of operation of an arbitration portion 303 shown in FIG. 15. FIG. 18 is a diagram showing signal waveforms occurring around the arbitration portion 303 shown in FIG. 17. FIG. 19 is a flow chart illustrating the procedures of processing associated with the open and closed states of the cover 30 in the digital camera shown in FIG. 15.

Among other components, the fourth embodiment provides a system LSI 305 and a communication control IC 304 as shown in FIG. 15.

More specifically, the communication control IC 304 is an integrated circuit for performing communication with an external device (not shown) via a communication line 306 and for performing transfer of data received from the external device or data to be transmitted to the external device with the system LSI 305. The communication control IC 304 performs communication with the external device in compliance with a standard, such as IEEE1394 or USB2.0. In addition, the communication control IC 304 has a data input/output port and a control signal port for data transfer with the system LSI 305.

The system LSI 305 includes, among others, an external DMA controller 301, a multiplexer 302 and an arbitration portion 303. The external DMA controller 301 is connected to the CPU bus 1 and serves as a control circuit for directly transferring data between the external device and the DRAM 6. The multiplexer 302 selects data and address buses of the external DMA controller 301 or data and address buses of the memory card controller 13 and connects the selected buses to an external bus 307. The arbitration portion 303 conducts arbitration of a data transfer request between the external DMA controller 301 and the memory card controller 13. Further, the arbitration portion 303 fetches a detection signal from the cover detection switch 18 and supplies the detection signal to the interrupt controller 26.

The connection signals between various components including the communication control IC 304 and the memory card controller 13 is now described in detail below with reference to FIG. 16.

The communication control IC 304 outputs a signal DMAREQ indicative of a communication request, which is supplied to the external DMA controller 301. The external DMA controller 301 outputs a communication acknowledge signal DMAACK, a write strobe signal WR and a read strobe signal RD, which are supplied to the communication control IC 304.

The memory card controller 13 outputs a chip enable signal CE, a write strobe signal WR and a read strobe signal RD, which are supplied to the socket 8 and the memory card 7. In addition, a card detection signal CD (hereinafter referred to as the "signal CD") exists at the memory card 7. The signal CD is connected to ground inside the memory card 7. The signal CD is connected to the memory card controller 13 via the socket 8 and is connected, between them, to a power source via a resistor, i.e., is pulled up. Accordingly, the signal CD as viewed from the memory card 7 is low when the memory card 7 is mounted on the socket 8, and is high when the memory card 7 is not mounted.

The arbitration portion 303 is a circuit for conducting arbitration of a right of use of the external bus 307 between the external DMA controller 301 and the memory card controller 13. The external DMA controller 301 outputs a right-of-use-of-bus request signal EXDMAREQ, which is supplied to the arbitration portion 303. The arbitration portion 303 outputs a use-of-bus grant signal EXDMAGRNT, which is supplied to the external DMA controller 301. In addition, the memory card controller 13 outputs a right-of-use-of-bus request signal CARDREQ, which is supplied to the arbitration portion 303.

The arbitration portion 303 also outputs a use-of-bus grant signal CARDGRNT, which is supplied to the memory card controller 13. Further, the arbitration portion 303 receives a detection signal COVEROPEN from the cover detection switch 18.

Buses including address and data buses of the external DMA controller 301 and the memory card controller 13 are connected to the multiplexer 302. The multiplexer 302 selects the buses of one of the external DMA controller 301 and the memory card controller 13 and connects the selected buses to the external bus 307. The external bus 307 is connected to the address and data buses of the memory card 7 via the address and data buses of the communication control IC 304 and the socket 8.

Operation of the arbitration portion 303 is described below with reference to FIGS. 17 and 18.

When both operations of the external DMA controller 301 and the memory card controller 13 are under suspension, the arbitration portion 303 comes into an idle state (step S301 shown in FIG. 17). The communication control IC 304 controls communication of data with an externally connected communication line (IEEE1394, USB2.0 or the like) or another external system connected to the communication line. Further, the communication control IC 304 generates a signal DMAREQ depending on conditions of communication with another system, for example, when data transmitted from another system exists in a data buffer within the communication control IC 304.

When receiving the signal DMAREQ from the communication control IC 304 at time A shown in FIG. 18, the external DMA controller 301 generates the signal EXDMAREQ to the arbitration portion 303. If, at step S301 shown in FIG. 17, the signal EXDMAREQ is true (logical "1"), the signal CARDREQ is false (logical "0") and the signal COVEROPEN is false, the state of the arbitration portion 303 proceeds to step S302. At step S302, the signal EXDMAGRNT becomes true, so that the external DMA controller 301 is given a right of use of the external bus 307.

The external DMA controller 301 controls the multiplexer 302 to cause the data bus of the external DMA controller 301 to be connected to the external bus 307, and performs transmission or receiving of data while asserting the signal DMAACK. Once transmission or receiving of data is attained, the external DMA controller 301 makes the signal EXDMAREQ false. Accordingly, the state of the arbitration portion 303 returns to step S301.

If the CPU 3 starts access to the memory card 7 before the above-described DMA (direct memory access) is completed, the memory card controller 13 makes the signal CARDREQ true at a point of time B shown in FIG. 18 and outputs this signal to the arbitration portion 303. In response to the signal CARDREQ, the state of the arbitration portion 303 proceeds from step S301 to step S303. Accordingly, the arbitration portion 303 makes the signal CARDGRNT true at time C and outputs this signal to the memory card controller 13. The memory card controller 13 recognizes that a right of use of bus is granted to the memory card 7, and performs access to the memory card 7. In accessing the memory card 7, the memory card controller 13 makes a signal CE true and outputs this signal to the memory card 7, thereby bringing the memory card 7 into a selected state. In this state, the memory card controller 13 makes the signal WR or RD true and outputs this signal to the memory card 7 to perform transmission or receiving of data. When one occurrence of access to the memory card 7 has been attained, the memory card controller 13 changes the signal CARDREQ from the true state to the false state. Accordingly, the arbitration portion 303 makes the signal CARDGRNT false and comes into the idle state (step S301).

If the external DMA controller 301 makes the signal EXD-MAREQ true and outputs this signal to the arbitration portion 303 during the process of access to the memory card 7, the arbitration portion 303 ends access to the memory card 7 and comes into the idle state (step S301). Then, the state of the arbitration portion 303 proceeds to step S302. Accordingly, the signal EXDMAGRNT becomes true at time D shown in FIG. 18, so that a right of use of the external bus 307 is given to the external DMA controller 301.

The external DMA controller 301 controls the multiplexer 302 to cause the data bus of the external DMA controller 301 to be connected to the external bus 307, and performs transmission or receiving of data while asserting the signal DMAACK. After transmission or receiving of data is attained, the external DMA controller 301 makes the signal EXDMAREQ false.

If, in this state, the cover 30 of the container portion 31 for the memory card 7 is opened, the signal COVEROPEN becomes true. In addition, in this state, it is assumed that the communication control IC 304 makes the signal DMAREQ true and outputs this signal to the external DMA controller 301 at time E shown in FIG. 18. Accordingly, the external DMA controller 301 makes the signal EXDMAREQ true and outputs this signal to the arbitration portion 303.

In the above case, the arbitration portion 303 recognizes that the signal EXDMAREQ has become true. However, since the signal COVEROPEN is true, the arbitration portion 303 does not grant a right of use of bus, and maintains the idle state (step S301). After that, if the user closes the cover 30 of the container portion 31 for the memory card 7, the signal COVEROPEN becomes false at time F shown in FIG. 18. In this instance, since the signal EXDMAREQ is true and the signal CARDREQ is false, the state of the arbitration portion 303 proceeds to step S302. In addition, the arbitration portion 303 makes the signal EXDMAGRNT true at time G shown in FIG. 18, and grants a right of use of bus to the external DMA controller 301. Accordingly, the external DMA controller 301 performs data transfer with the communication control IC 304. After that, the external DMA controller 301 makes the signal EXDMAREQ false, so that the state of the arbitration portion 303 returns to the idle state (step S301).

Processing associated with the open and closed states of the cover 30 in the digital camera according to the fourth embodiment is described below with reference to FIG. 19.

Referring to the flow chart of FIG. 19 according to the fourth embodiment, at step S331, the CPU 3 first checks to determine if the cover 30 is open, on the basis of a detection signal from the cover detection switch 18. If the cover 30 is open, the CPU 3 proceeds to step S332. At step S332, the CPU 3 causes a message indicative of the open state of the cover 30 to be displayed on the display 11, and exits from this processing. If it is determined at step S331 that the cover 30 is closed by the user, the CPU 3 proceeds to step S341. At step S341, the CPU 3 erases the message displayed on the display 11, and exits from this processing.

As described above, in the digital camera according to the fourth embodiment, data transfer with respect to the communication control IC 304 and data transfer with respect to the memory card 7 can be performed by using one data bus. Accordingly, even if noise is caused at the external bus 307 by insertion or extraction of the memory card 7, any circuit does not access the external bus 307. Therefore, no data error occurs in communication with the communication control IC 304.

Furthermore, since the CPU 3 does not suspend its operation during the time when the cover 30 is open, the digital camera can continue its processing operation during the time when the cover 30 is open. Accordingly, a more reliable digital camera that is less prone to failure can be provided.

It should be noted that the fourth embodiment can also be implemented with image input apparatuses other than digital cameras (for example, digital video cameras, camera integrated mobile phones and camera integrated portable terminals).

Other Embodiments

The present invention can also be achieved by providing a system or apparatus with a storage medium (or a recording medium) that stores a program code of software for realizing any one the functions of the above-described embodiments, and causing a computer (or a CPU, MPU or the like) of the system or apparatus to read the program code from the storage medium and then to execute the program code. In this case, the program code itself read from the storage medium realizes the novel functions of the embodiments, and a storage medium storing the program code constitutes the invention. Furthermore, besides the program code read by the computer being executed to realize the functions of the above-described embodiments, the present invention includes an OS (operating system) or the like running on the computer performing an actual process in whole or in part according to instructions of the program code to realize the functions of the above-described embodiments.

Moreover, the present invention also includes a CPU or the like contained in a function expansion board inserted into the computer or in a function expansion unit connected to the computer, the function expansion board or the function expansion unit having a memory in which the program code read from the storage medium is written, the CPU or the like performing an actual process in whole or in part according to instructions of the program code to realize the functions of the above-described embodiments.

The above-described embodiments are merely exemplary of the present invention, and are not to be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

What is claimed is:

1. An image input apparatus comprising:
   a connection unit capable of connecting with a detachable storage medium;
   a first storage unit that stores a program for controlling the image input apparatus and also stores a user interface image to be displayed on a display unit;
   a bus communicably coupled with the first storage unit and the connection unit;
   a second storage unit that stores the program transferred from the first storage unit, the second storage unit not being communicably coupled with the bus;
   a container unit adapted to contain the detachable storage medium;
   a detecting unit adapted to detect whether a cover of the container unit is open; and
   a control unit configured to use the bus to access one of the detachable storage medium and the first storage unit, wherein if the control unit determines that the cover is open, the control unit disables access from the control unit to the first storage unit, the control unit controls the image input apparatus in accordance with the program stored in the second storage unit while the cover is open, and if the control unit determines that the cover is not open, the control unit allows to transfer the user interface image from the first storage unit to the second storage unit so that the user interface image can be displayed on the display unit.

2. The image input apparatus according to claim 1, wherein the image input apparatus is one of a digital camera, a digital video camera, a mobile phone including a camera, and a portable terminal including a camera.

3. The image input apparatus according to claim 1, wherein the control unit causes the display unit to display a readable message notifying a user that the cover is open, if the control unit determines that the cover is open.

4. A method for controlling an image input apparatus, the image input apparatus including (a) a connection unit capable of connecting with a detachable storage medium, (b) a first storage unit that stores a program for controlling the image input apparatus, (c) a bus communicably coupled with the first storage unit and the connection unit, (d) a container unit adapted to contain the detachable storage medium, and (e) a control unit configured to use the bus to access one of the detachable storage medium and the first storage unit, the method comprising:

storing the program transferred from the first storage unit in a second storage unit, wherein the first storage unit also stores a user interface image to be displayed on a display unit;

detecting whether a cover of the container unit is open;

if it is determined by the control unit that the cover is open, disabling access from the control unit to the first storage unit;

controlling the image input apparatus in accordance with the program stored in the second storage unit while the cover is open; and if it is determined by the control unit that the cover is not open, allowing to transfer the user interface image from the first storage unit to the second storage unit so that the user interface image can be displayed on the display unit, wherein the second storage unit is not communicably coupled with the bus.

5. The method according to claim 4, wherein the image input apparatus is one of a digital camera, a digital video camera, a mobile phone including a camera, and a portable terminal including a camera.

6. The method according to claim 4, further comprising:

if it is determined by the control unit that the cover is open, causing the display unit to display a readable message notifying a user that the cover is open.

* * * * *